(12) United States Patent
Smith et al.

(10) Patent No.: US 12,333,025 B2
(45) Date of Patent: Jun. 17, 2025

(54) PROTECTED DATA ACCESSES USING REMOTE COPY OPERATIONS

(71) Applicant: Intel Corporation, Santa Clara, CA (US)

(72) Inventors: Ned Smith, Beaverton, OR (US); Kshitij A. Doshi, Tempe, AZ (US); Francesc Guim Bernat, Barcelona (ES); Kapil Sood, Washougal, WA (US); Tarun Viswanathan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 18/370,137

(22) Filed: Sep. 19, 2023

(65) Prior Publication Data
US 2024/0111879 A1 Apr. 4, 2024

Related U.S. Application Data

(63) Continuation of application No. 16/845,885, filed on Apr. 10, 2020, now Pat. No. 11,797,690.
(Continued)

(51) Int. Cl.
*G06F 21/60* (2013.01)
*G06F 15/173* (2006.01)
*H04L 9/32* (2006.01)

(52) U.S. Cl.
CPC ...... *G06F 21/602* (2013.01); *G06F 15/17331* (2013.01); *H04L 9/3268* (2013.01)

(58) Field of Classification Search
CPC .......... G06F 21/602; G06F 21/335; G06F 15/17331; G06F 15/161; H04L 9/3268;
(Continued)

(56) References Cited

U.S. PATENT DOCUMENTS 9,432,183 B1 * 8/2016 Axnix ............... H04L 9/0822
10,691,619 B1 6/2020 Gibson et al.
(Continued)

OTHER PUBLICATIONS

"Storing a secure key in an embedded device's memory", StackExchange Electrical Engineering, https://electronics.stackexchange.com/questions/198274/storing-a-secure-key-in-an-embedded-devices-memory, last edited Jul. 23, 2018, 4 pages.
(Continued)

*Primary Examiner* — Sangseok Park
(74) *Attorney, Agent, or Firm* — Essential Patents Group, LLP; Christopher K. Gagne

(57) ABSTRACT

Examples herein relate to an interface selectively providing access to a memory region for a work request from an entity by providing selective access to a physical address of the memory region and selective access to a cryptographic key for use by a memory controller to access the memory region. In some examples, providing selective access to a physical address conversion is based on one or more of: validation of a certificate received with the work request and an identifier of the entity being associated with a process with access to the memory region. Access to the memory region can be specified to be one or more of: create, read, update, delete, write, or notify. A memory region can be a page or sub-page sized region. Different access rights can be associated with different sub-portions of the memory region, wherein the access rights comprise one or more of: create, read, update, delete, write, or notify.

30 Claims, 25 Drawing Sheets

Related U.S. Application Data

(60) Provisional application No. 62/832,649, filed on Apr. 11, 2019.

(58) Field of Classification Search
CPC ......... H04L 9/088; H04L 9/14; H04L 9/0894; H04L 63/0485; H04L 63/0823; H04L 63/10

See application file for complete search history.

(56) References Cited

U.S. PATENT DOCUMENTS

| | | | |
|---|---|---|---|
| 10,901,627 | B1 | 1/2021 | BShara et al. |
| 2016/0380908 | A1* | 12/2016 | Larsson .................. G06N 5/04 709/226 |
| 2019/0079897 | A1* | 3/2019 | Kochevar-Cureton ...................... H04L 12/4641 |
| 2020/0213246 | A1 | 7/2020 | Pan et al. |
| 2020/0401441 | A1 | 12/2020 | Evans et al. |

OTHER PUBLICATIONS

AMD, "AMD Secure Encrypted Virtualization (SER) AMD EPYC Hardware Memory Encryption" AMD Developer Central, https://web.archive.org/web/20200307003329/https://developer.amd.com/sev/, Mar. 7, 2020, 5 pages.
AMD, "AMD's Secure Memory Encryption (SME) and Secure Encrypted Virtualization (SEV)" Huchtech, https://firmwaresecurity. com/2016/04/26/amds-secure-memory-encryption-sme-and-secure-encrypted-virtualization-sev/, Apr. 26, 206, 2 pages.
Final Office Action for U.S. Appl. No. 16/845,885, Mailed Mar. 3, 2023, 31 pages.
First Office Action for U.S. Appl. No. 16/845,885, Mailed Aug. 16, 2022, 18 pages.
Flinck, Hannu, "Multi-access Edge Computing (MEC) Applications", NOKIA Bell Labs, Mar. 29, 2017, 18 pages.
Guo, Chuanxiong, et al., "RDMA over Commodity Ethernet at Scale", ACM, SIGCOMM '16, Aug. 22-26, 2016, 14 pages.
Hilland, Jeff, et al., "RDMA Protocol Verbs Specification (Version 1.0)", Apr. 2003, 243 pages.
Intel, "Intel® Architecture Memory Encryption Technologies Specification", Rev: 1.1, Dec. 2017, 30 pages.
Mellanox Technologies, "RDMA Aware Networks Programming User Manual", Rev 1.7, © Copyright 2015. Mellanox Technologies, 216 pages.
Mellanox Technologies, "Security in Mellanox Technologies InfiniBand Fabrics", Technical Overview, White Paper, © Copyright 2012, 7 pages.
Notice of Allowance for U.S. Appl. No. 16/845,885, Mailed Jun. 20, 2023, 9 pages.
Recio, Renato, "RDMA enabled NIC (RNIC) Verbs Overview", Apr. 29, 2003, 28 pages.
Sabella, Dario, et al., "Developing Software for Multi-Access Edge Computing", ETSI White Paper No. 20, 2nd edition—Feb. 2019, 38 pages.
Sabella, Dario, et al., "Security at the Edge an Overview", Intel, IEEE 5G World Forum, Oct. 1, 2019, 38 pages.

* cited by examiner

PROTECTED DATA ACCESSES USING REMOTE COPY OPERATIONS

RELATED APPLICATION

This application is a continuation of U.S. patent application Ser. No. 16/845,885, filed Apr. 10, 2020, which claims the benefit of U.S. Provisional Patent Application No. 62/832,649, filed Apr. 11, 2019. The entire specifications of which are hereby incorporated herein by reference in their entirety.

BACKGROUND

Scale-out and distributed architectures increase computing resources or available memory or storage adding processors, memory, and storage for access using a fabric or network. Remote direct memory access (RDMA) enabling a network interface to copy data received from a medium from a source device directly to application memory of a target device and reducing an amount of data copies that take place. RDMA is increasingly utilized to transfer data in scale-out and distributed architectures.

DETAILED DESCRIPTION

Figure 1:
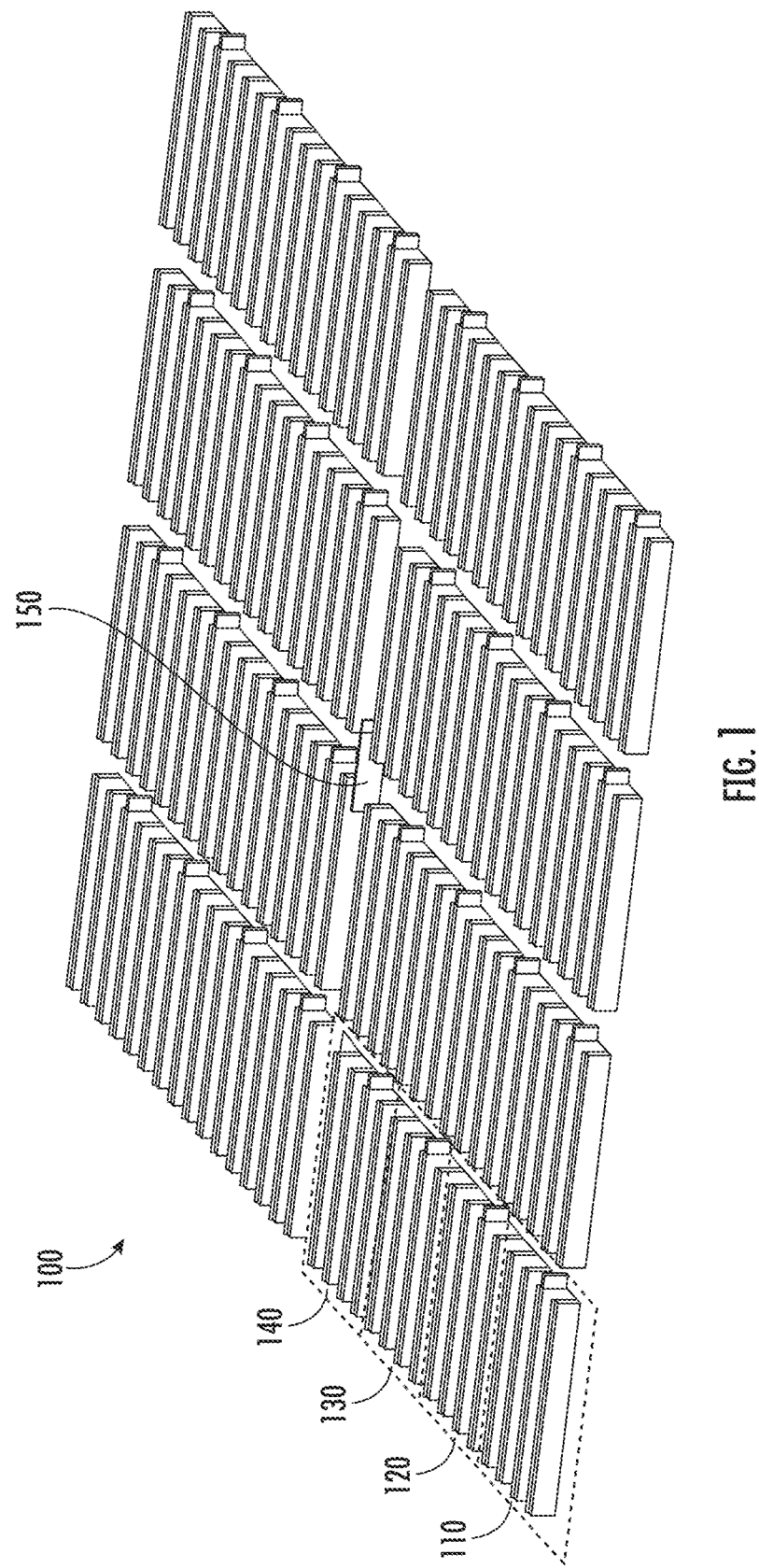
FIG. 1 is a simplified diagram of at least one embodiment of a data center for executing workloads with disaggregated resources.

RDMA can be used to implement disaggregation of multiple types of resources (e.g., field programmable gate arrays (FPGAs), graphics processing units (GPUs), non-volatile memory (NVM), and so forth). Hence, RDMA can be used to implement more efficient, accelerated and scalable protocols (e.g., non-volatile memory express over Fabrics (NVMe-oF)). Scale-out software architectures such as SAP-HANA scale out using RDMA to communicate the multiple scale-out servers with parts of the database. As another example, chains of Functions as a Service (FaaS) can use RDMA to implement data plane communication when data is to be propagated across multiple functions residing in different sleds or computing devices connected using an interconnect.

RDMA processing can be implemented in Network Interface Cards or Host Fabric Interconnects. For example, software on machine A (initiator) can initiate "load/store" at Process Address Space ID (PASID) p, offset o, at machine B (target). Next, machine B can translate <p,o> to a physical address φ in machine B and data D at physical address φ can be accessed by the initiator. However, if a process on machine C is trying to access to memory [X1,X2] and permission is not configured in the target machine, the page walk will fail and the memory access will not be granted.

In some cases, keys that decrypt a memory region are allocated to an entity on a platform (e.g., software process, device (e.g., processor, accelerator or network interface), container or virtual machine (VM)). Various embodiments provide for a mutual access agreement between a remote entity and local entity so that a remote entity can access memory using the key. Various embodiments provide an ability to share keys among entities. Various embodiments can be used in distributed architectures across public and private clouds. A hierarchy of trust can be created that transcends an entity, node, or workload. Various embodiments provide for deployment of RDMA or other remote direct copy techniques with fine grained security and memory permission mappings. For example, various embodiments provide an ability to specify read, write or execute memory or storage address ranges at any potential targets (e.g., [x,y] memory of process A in server 1) for different authorized peers (e.g., process B can read [x,y] memory but not write to [x,y] memory). A target network interface or Host Fabric Interface (HFI) can perform such access control checks and validate the requestor of memory operations (e.g., using certificates). Various embodiments configure a memory controller to use a proper key (e.g., multiple key total memory encryption (MKTME) key) to read data from a memory region, decrypt the read data, modify the read data with received data, encrypt the modified data and write the encrypted modified data to the memory region. Various embodiments configure a memory controller to use a proper key to decrypt data read from a memory region and provide the data to a network or host interface. In some examples, the memory controller can write encrypted content received from the network or host interface directly into the memory region without decryption or read encrypted content from the memory region to provide to a network or host interface for transmission to another device.

Various embodiments provide for a network or host interface: (1) validating remote memory access requests arriving to a target node and authentication and attestation that the actual RDMA request has been generated by a source; (2) specifying different levels of permission within different memory ranges of a target memory; and (3) allowing utilization of keys of a PASID on the target by at least a memory controller so that the remote memory access requests can access encrypted data.

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
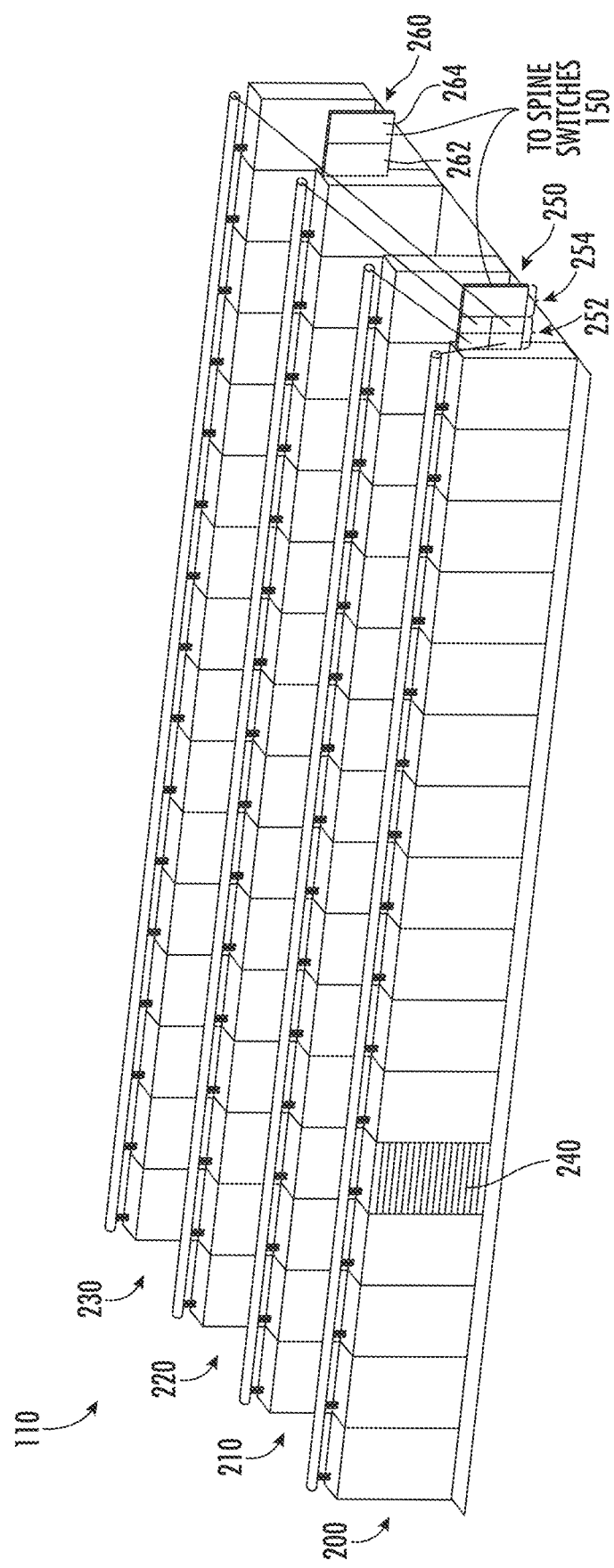
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
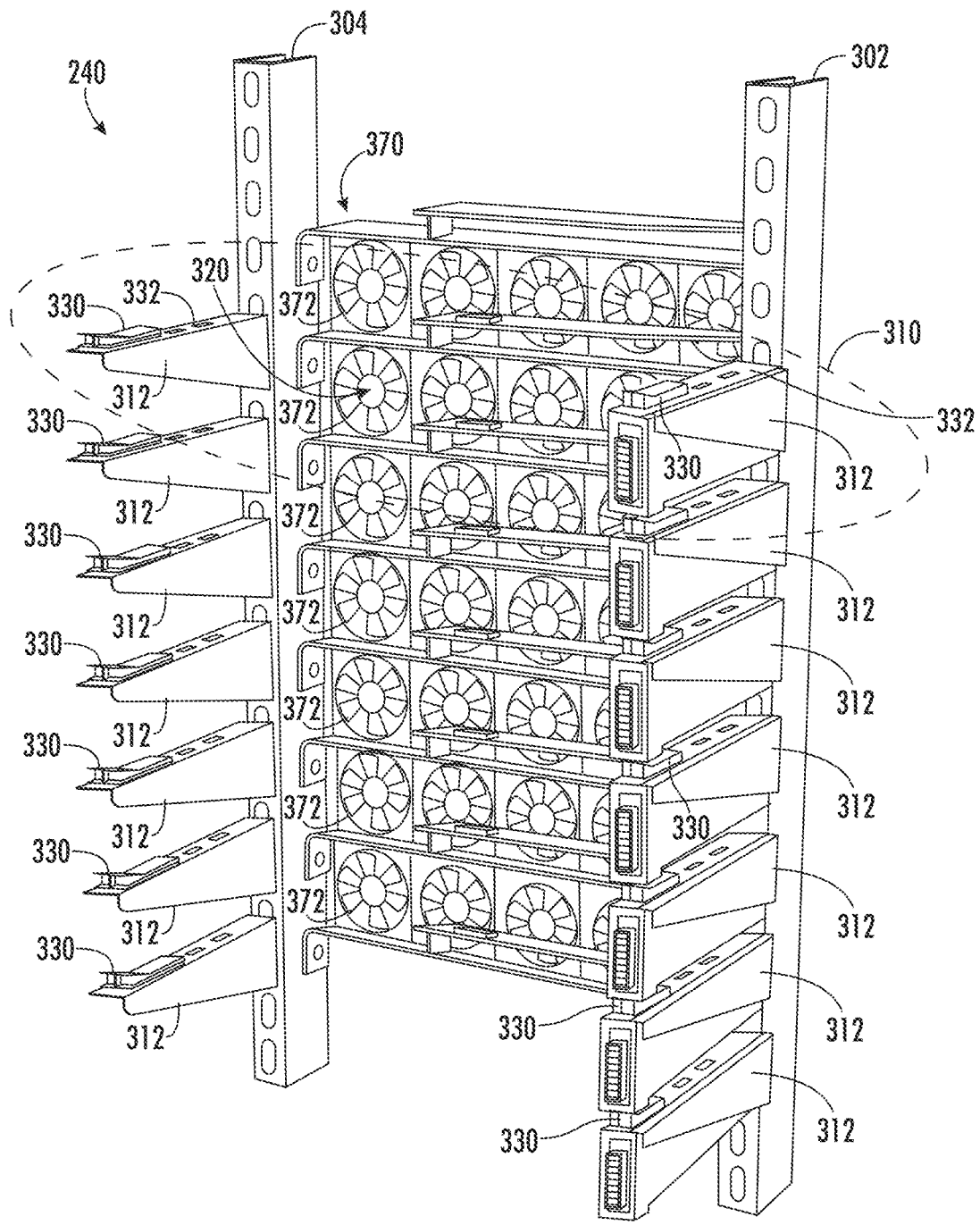
FIG. 3 is a perspective view of at least one embodiment of a rack that may be included in a pod.
Figure 4:
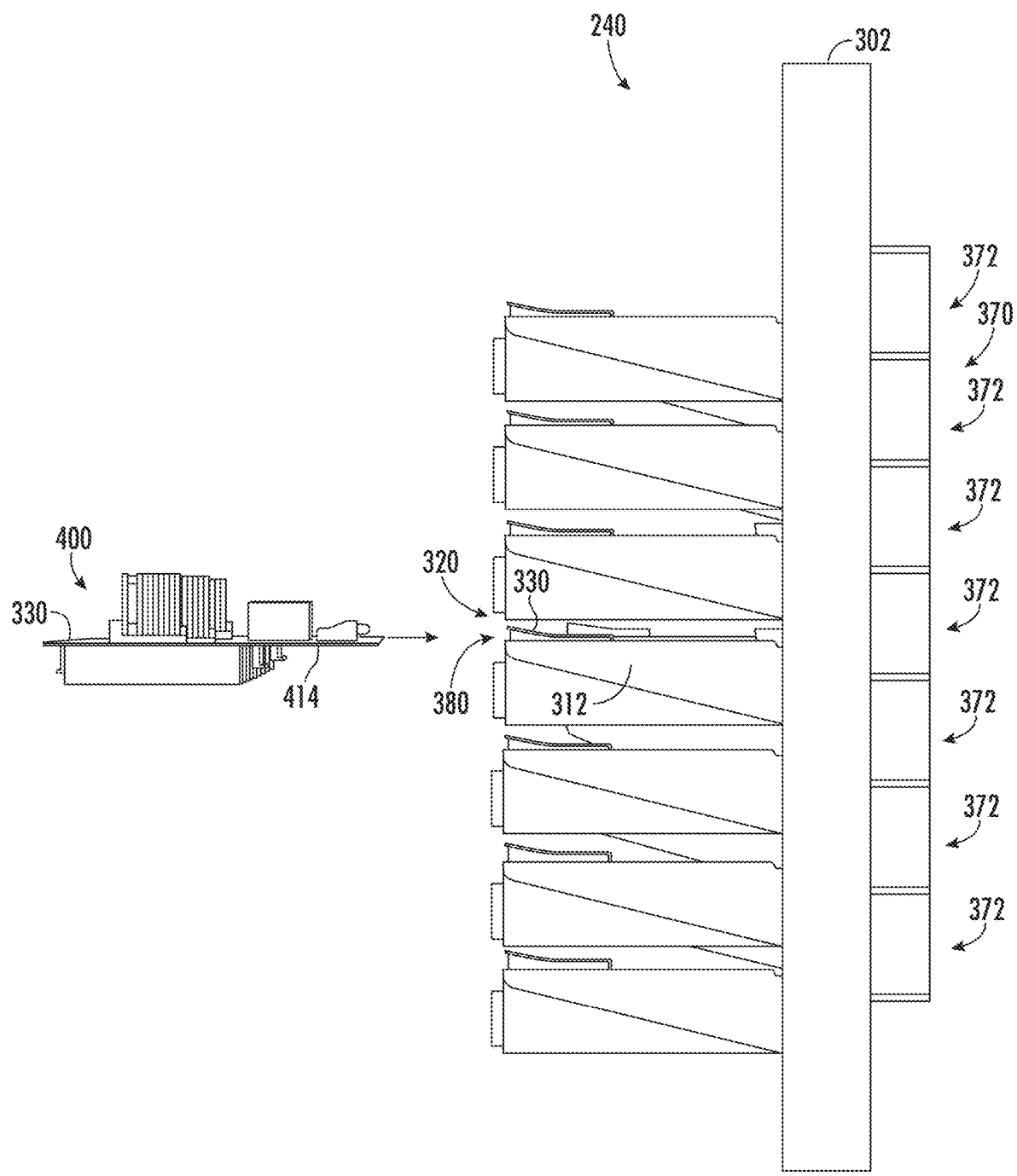
FIG. 4 is a side elevation view of a rack.
Figure 5:
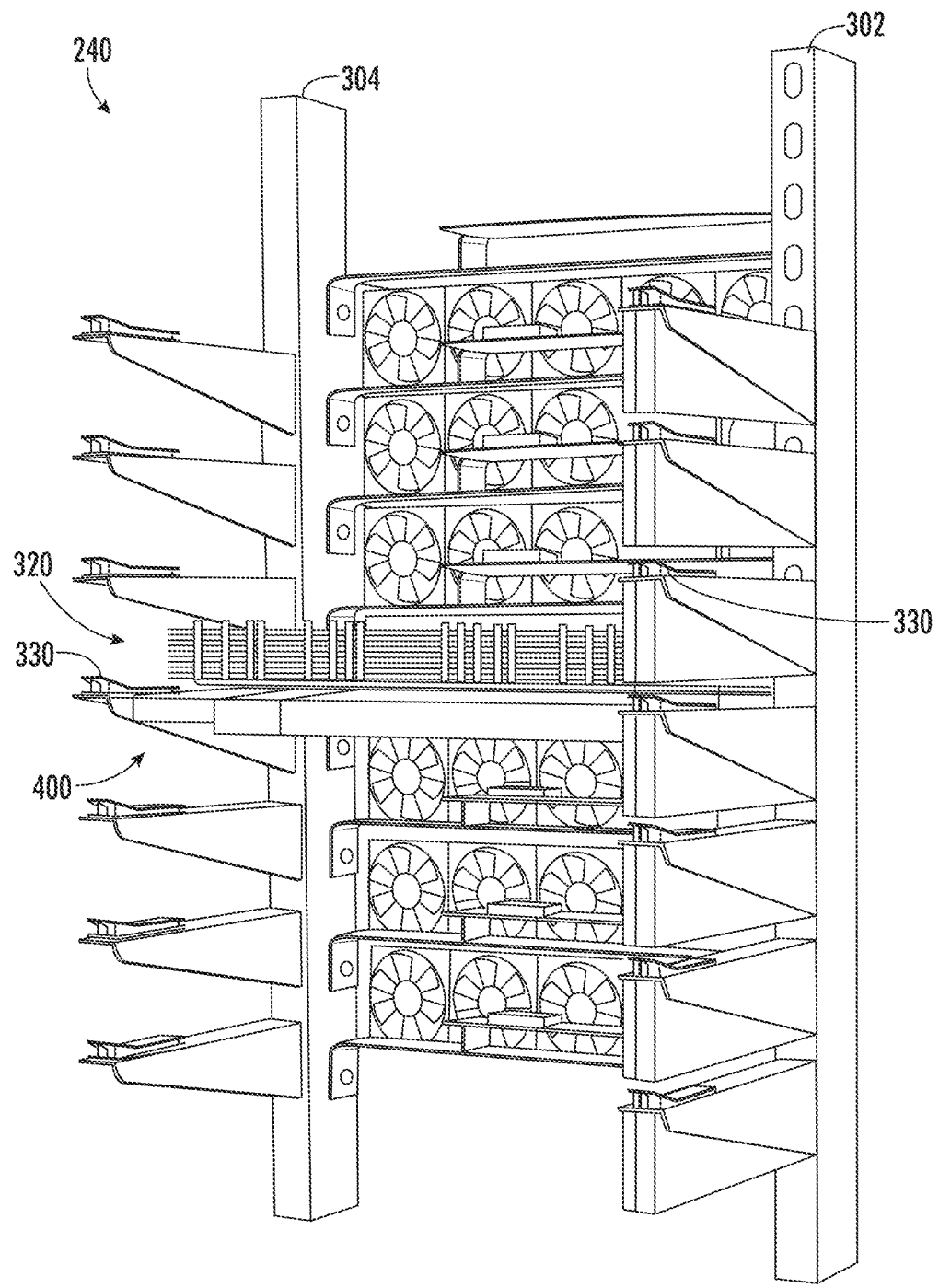
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
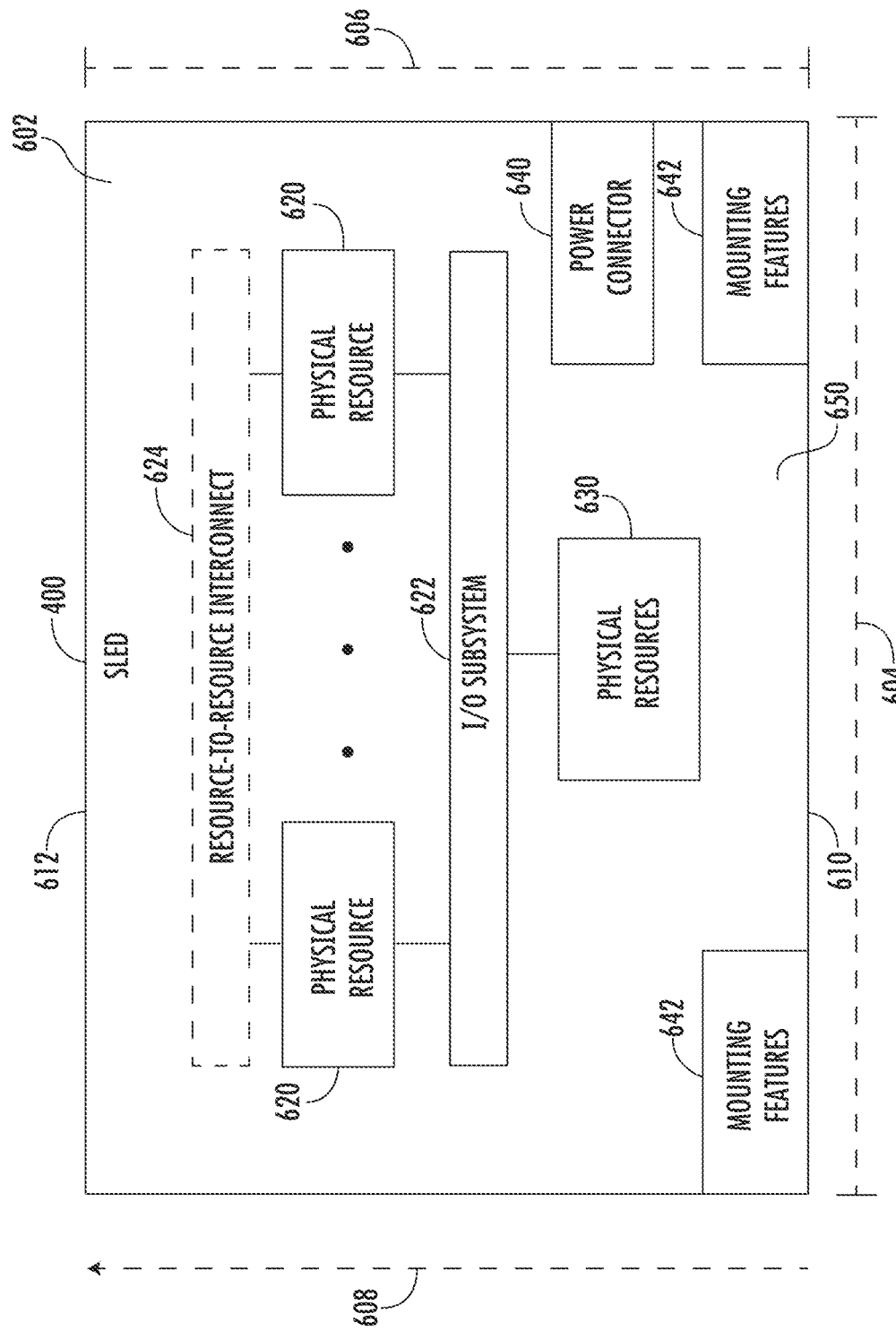
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
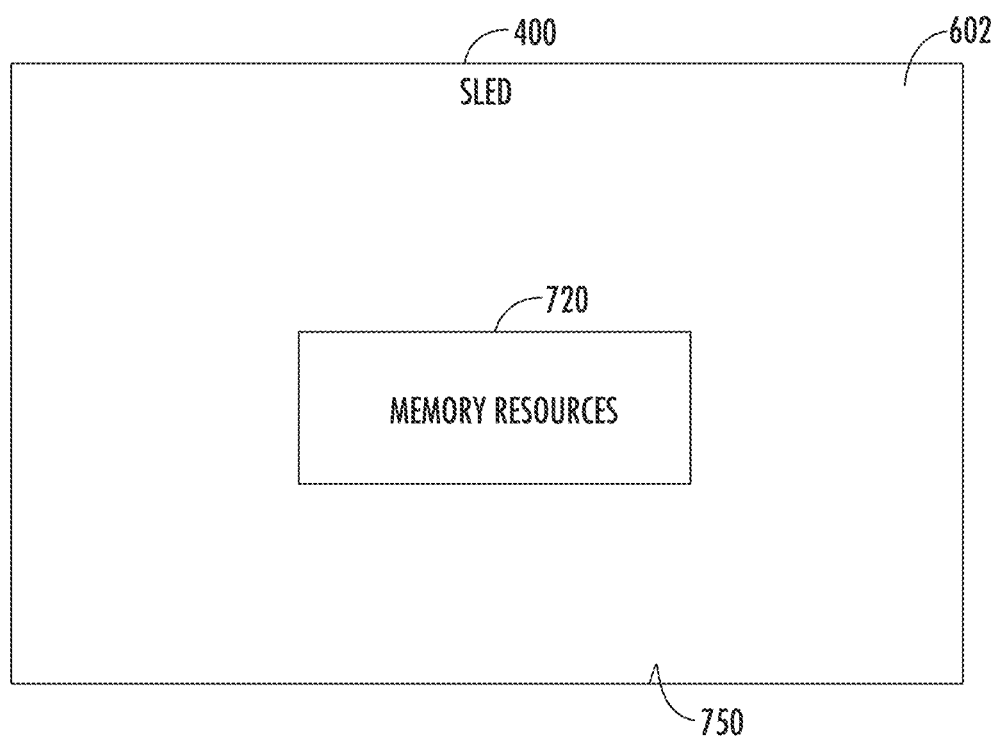
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
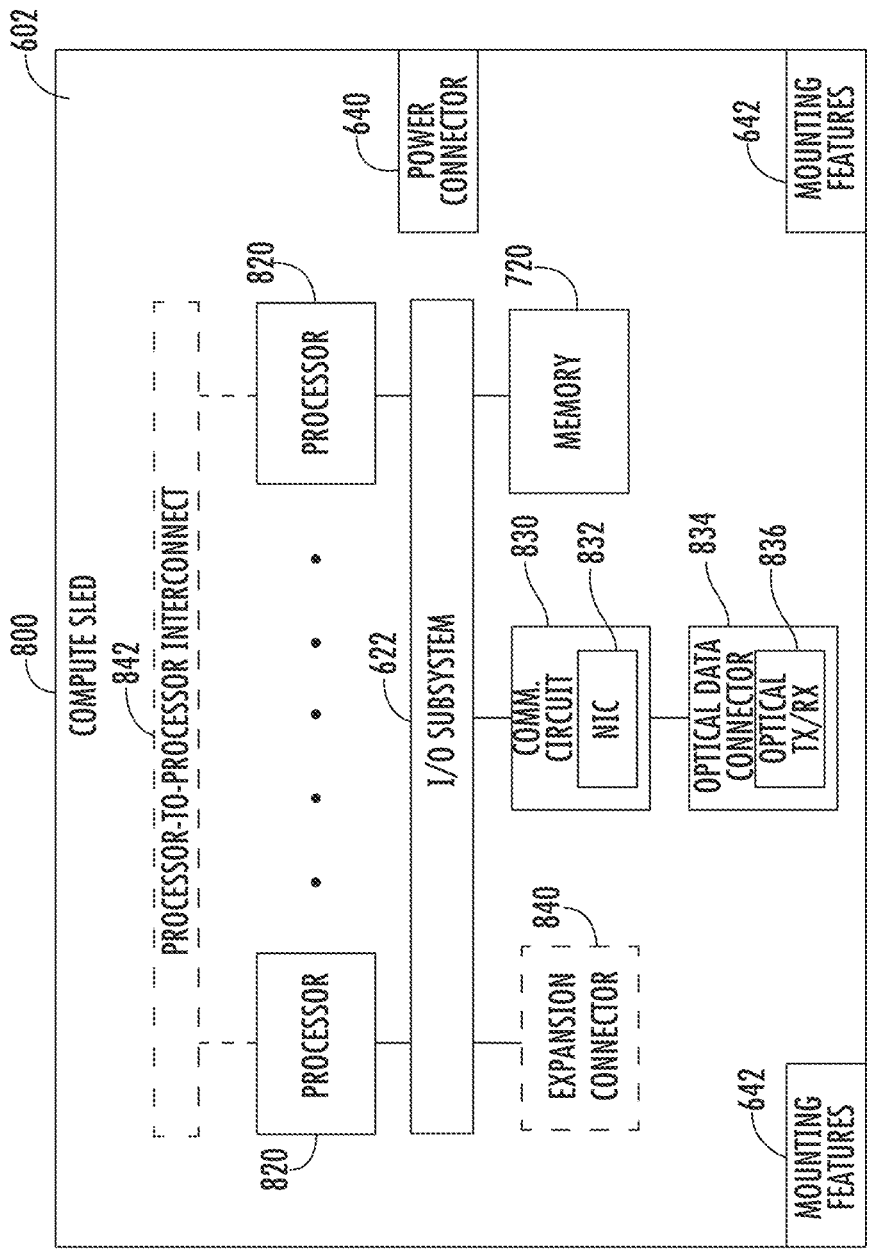
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
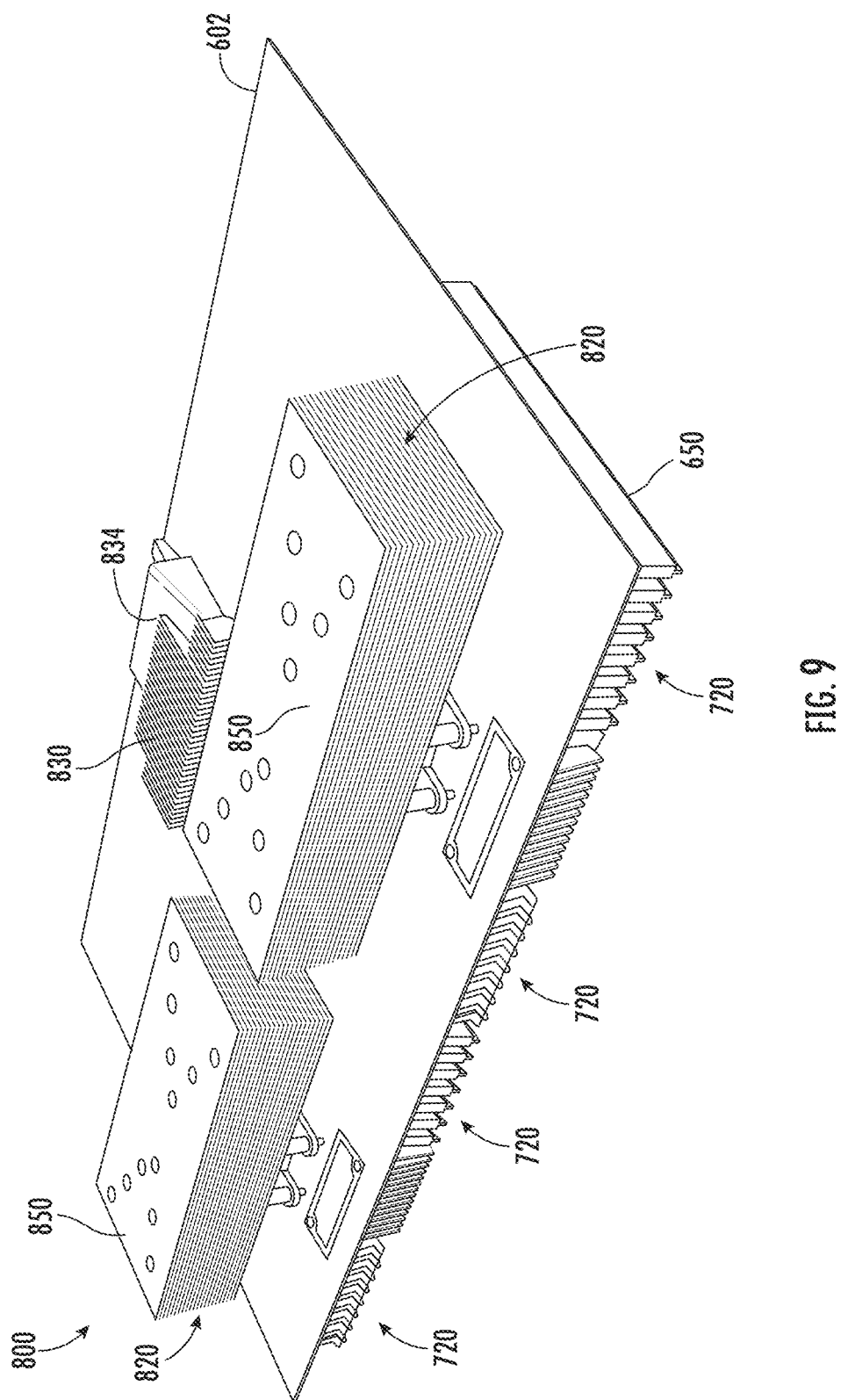
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
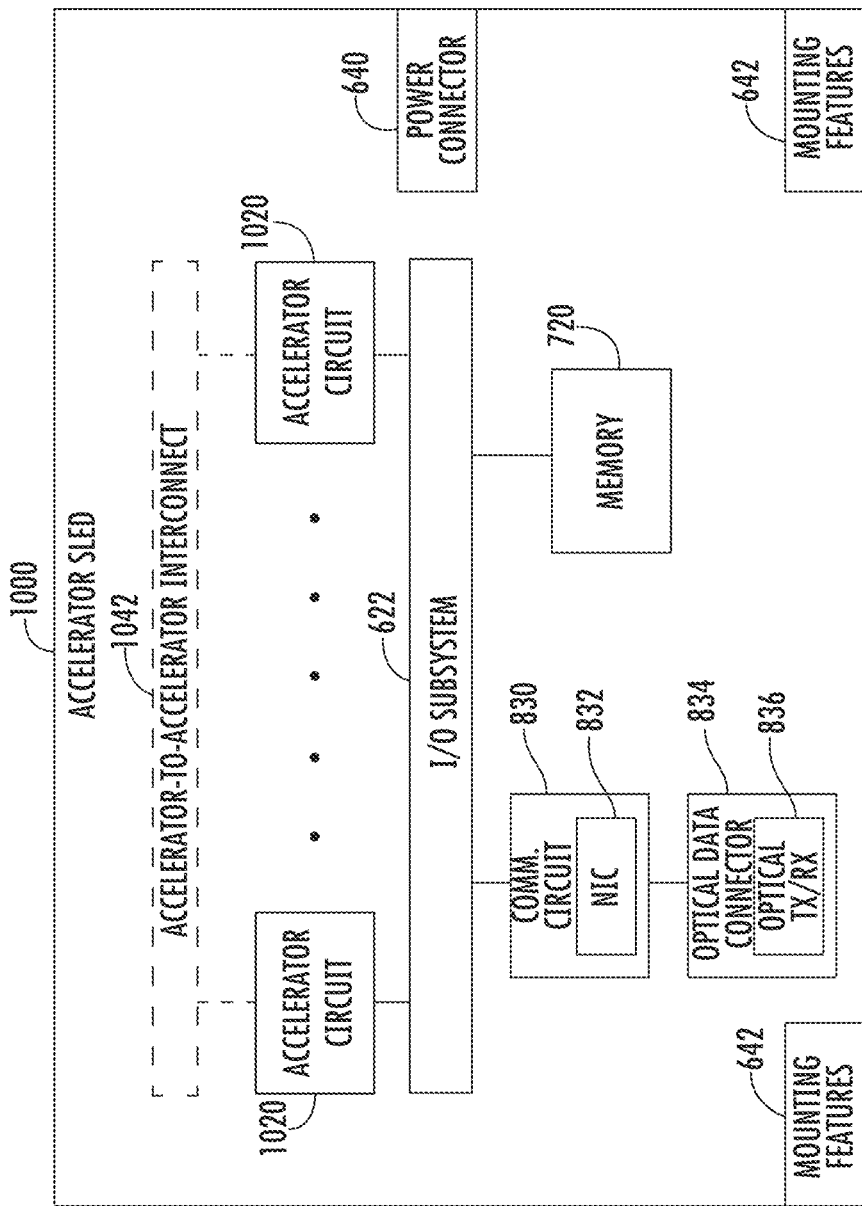
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
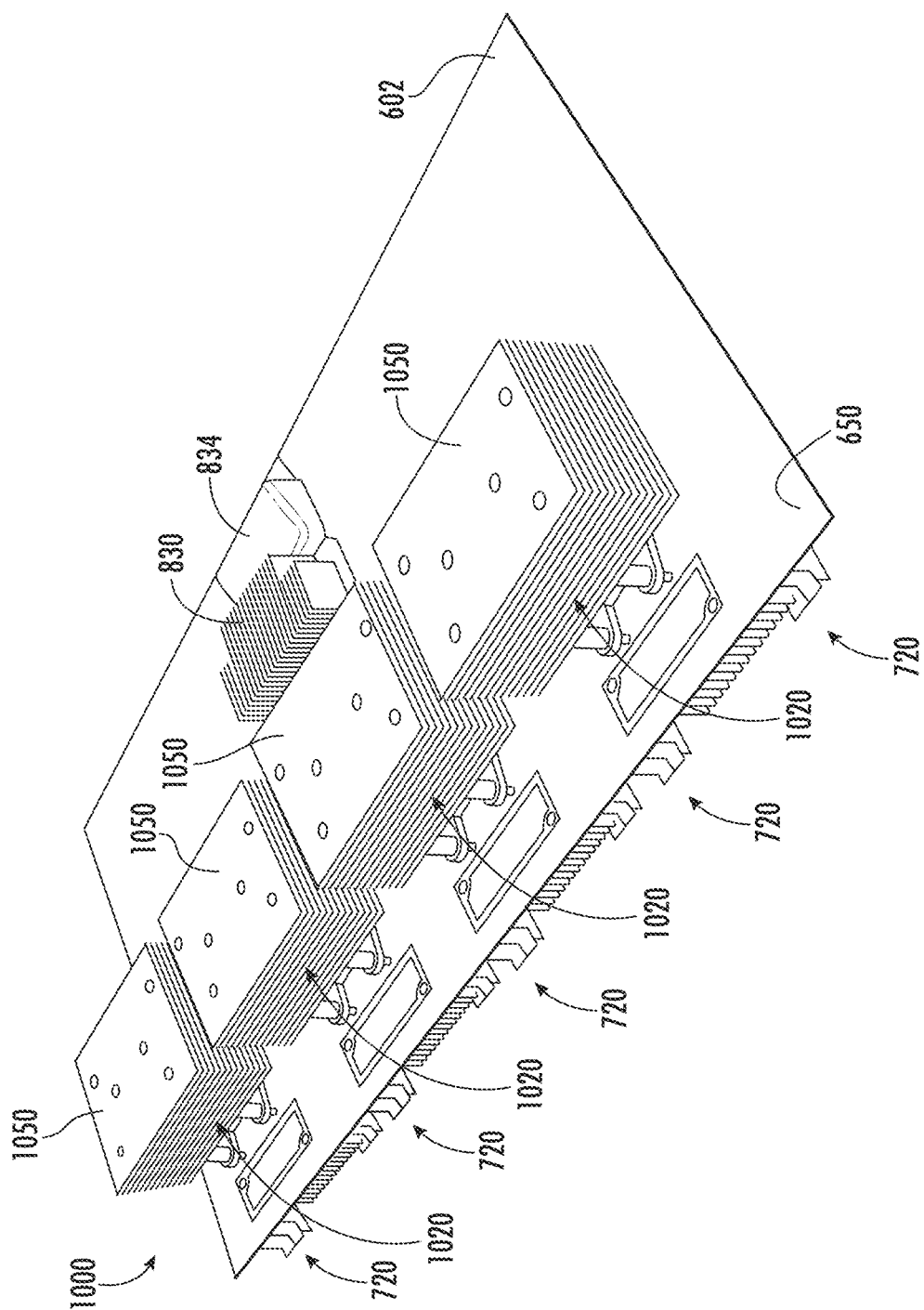
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
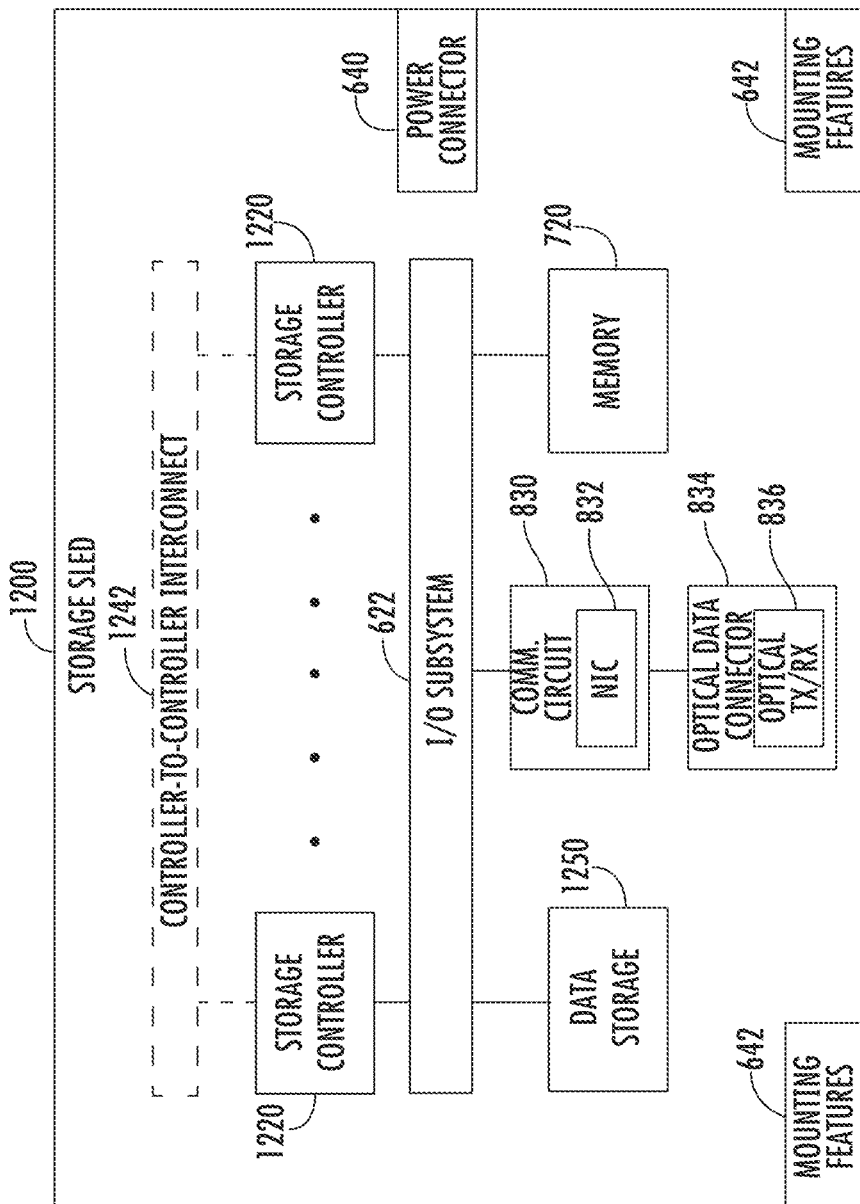
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
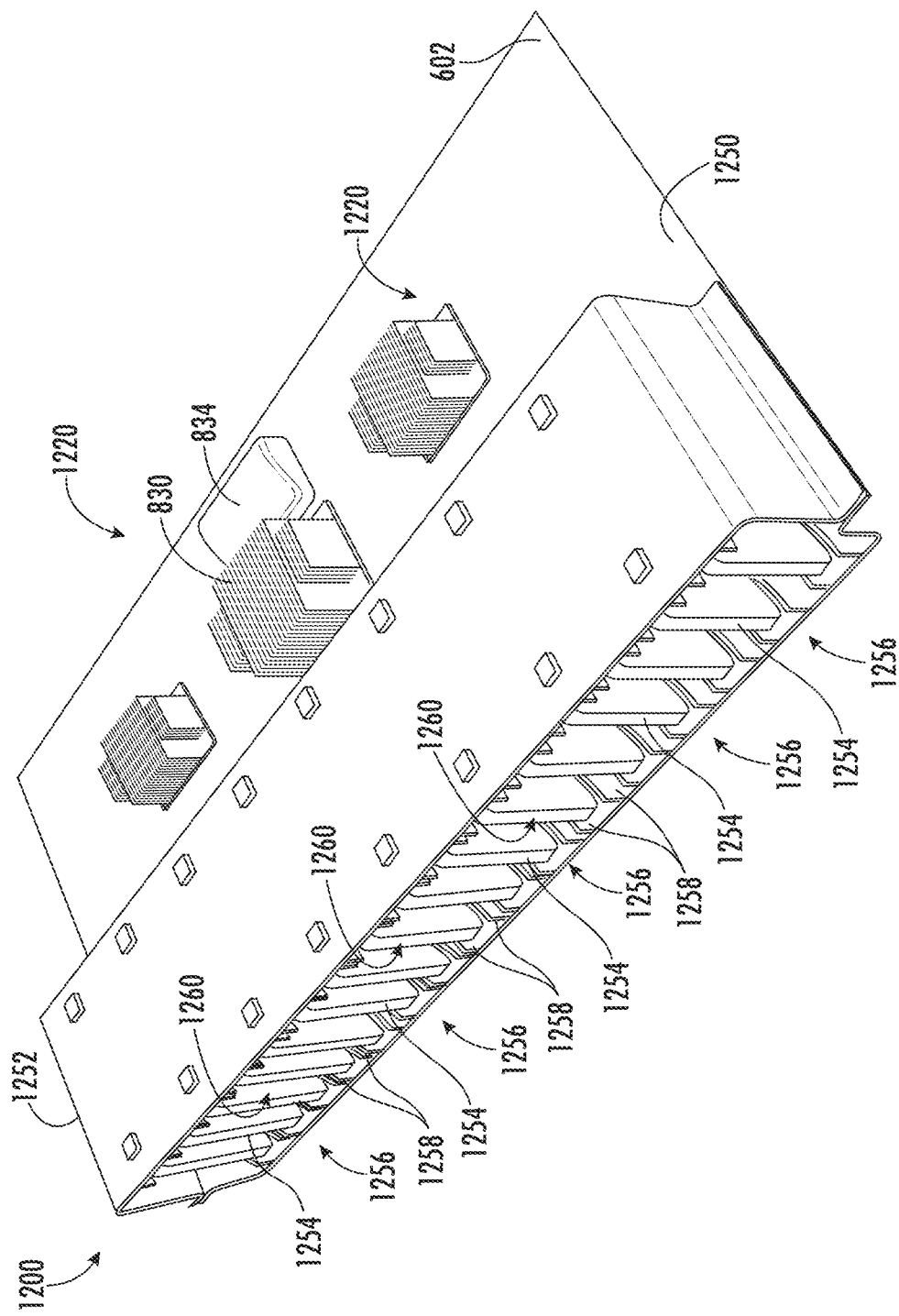
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
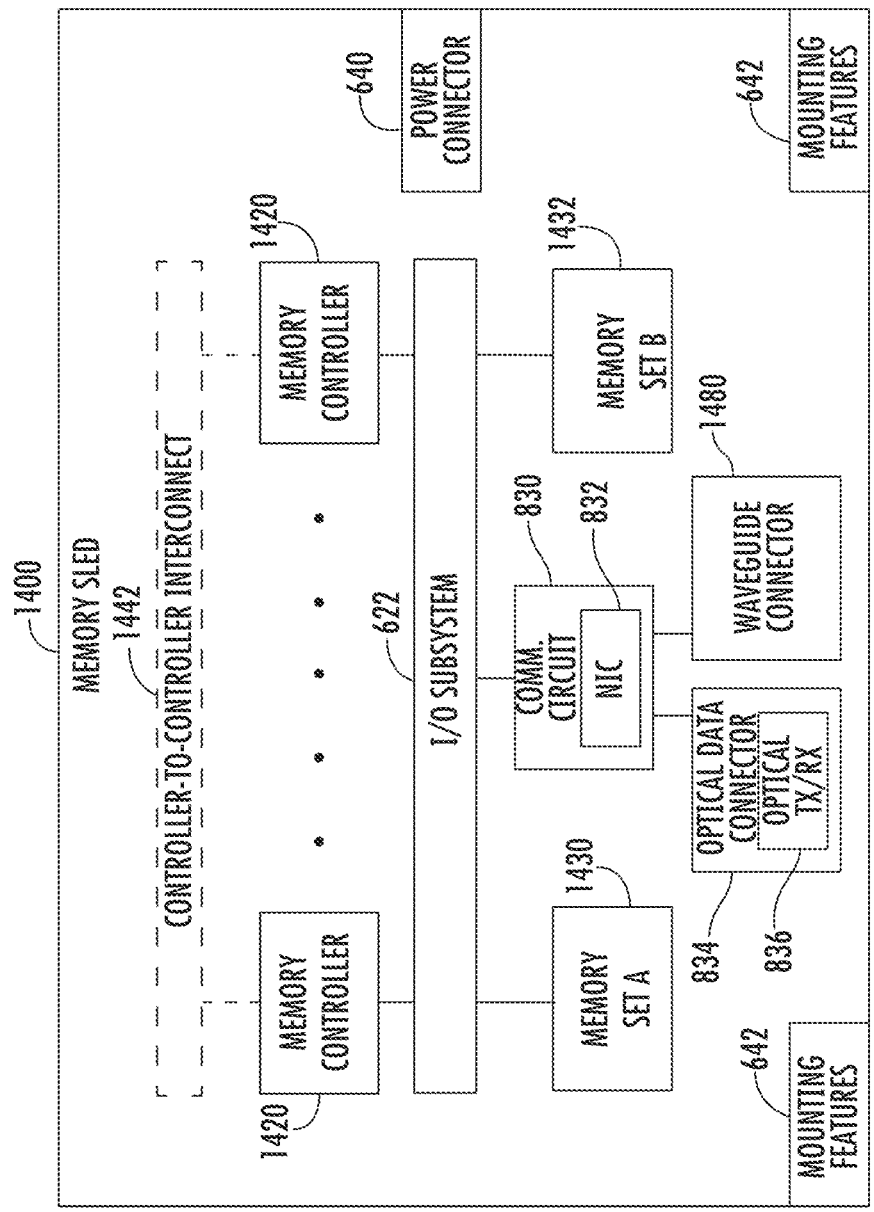
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
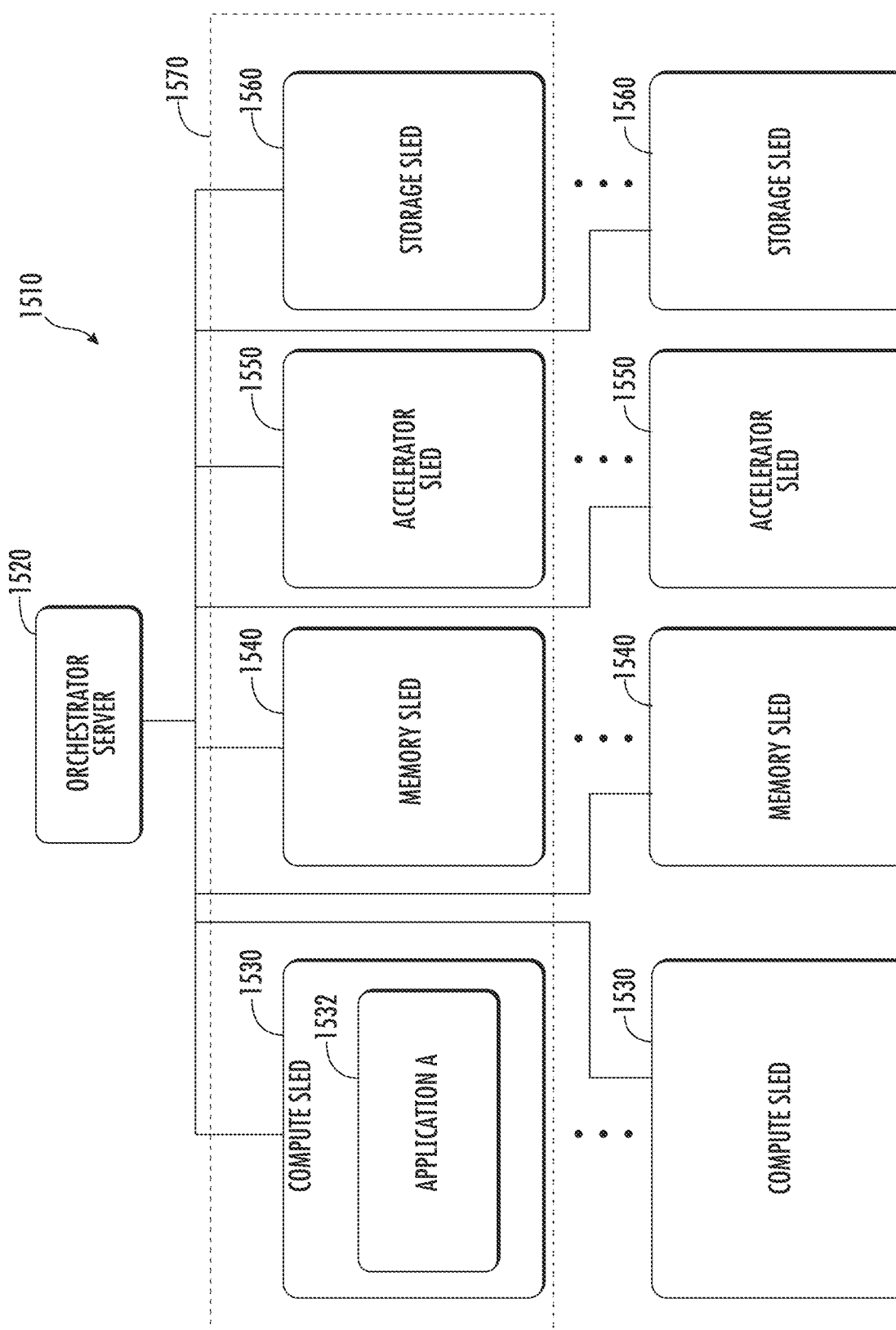
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
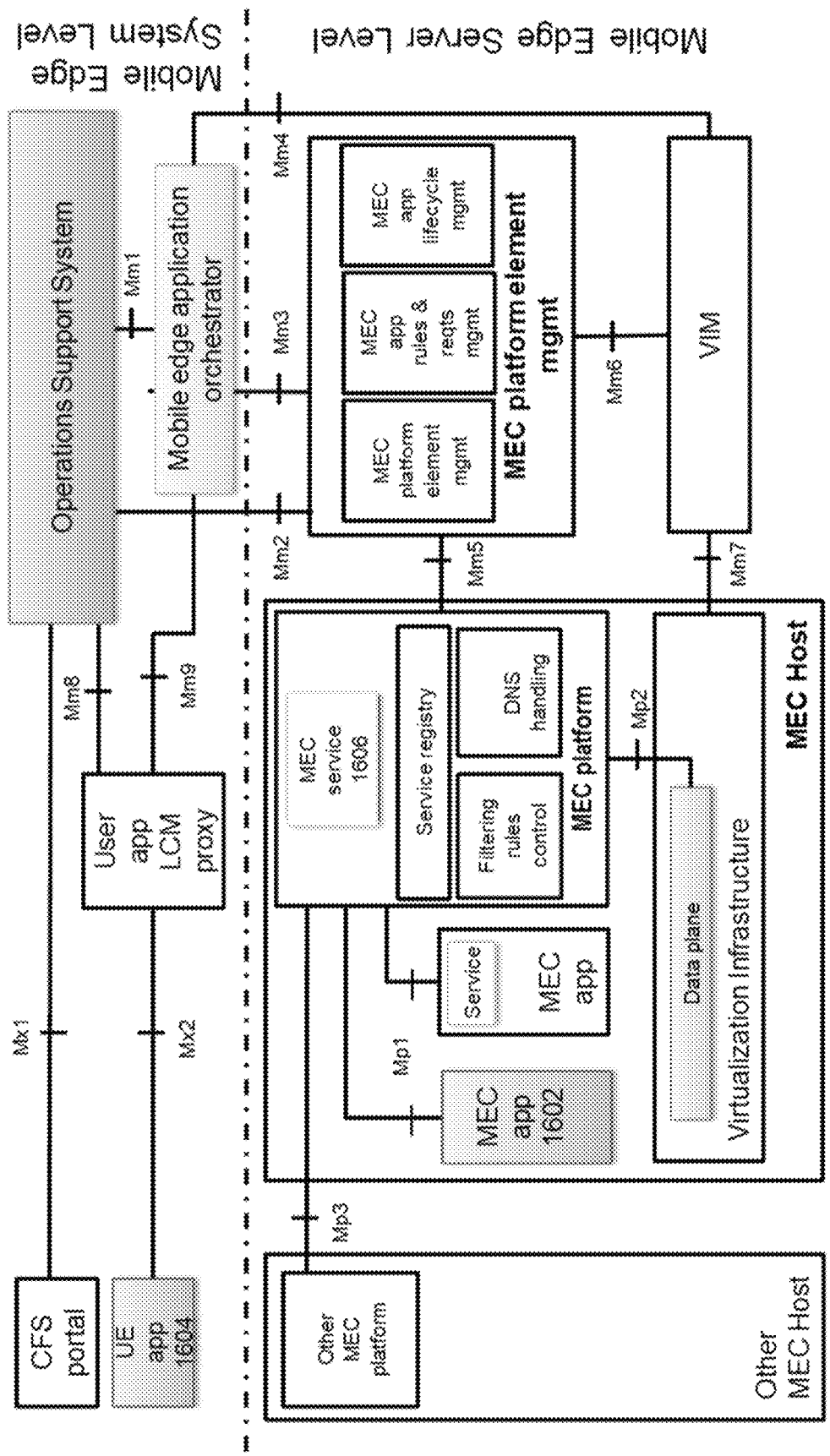
FIG. 16 shows an example multi-access edge (MEC) architecture.

FIG. 16 shows an example multi-access edge (MEC) architecture where a user equipment device (UE) application (app) is associated with a MEC Server hosted MEC App that further accesses MEC services and MEC orchestration capabilities. UE app 1604 (peer) can run on a client device (e.g., phone, table, personal computer). UE app 1604 can perform the user/tenant workloads and MEC App 1602 is the UE App's agent hosted by the MEC infrastructure such that MEC App 1602 provides service interface for UE app 1604. Multi access edge architecture allows a client (e.g., UE app 1604) to communicate with an MEC (e.g., proxy for a client that runs inside an execution environment). The architecture can preserve tenant boundary (user environment), MEC app 1602, and backend resource partitioning. This architecture isolates the UE App 1604 from the MEC infrastructure for safety and security. In some cases, MEC App 1602 is to be isolated from other tenants' MEC Apps that may also be hosted by the MEC infrastructure. Life cycle management (LCM) proxy provides a proxy for UE app 1604, sets up a connection between the UE app 1604 and MEC app 1602, and isolates the UE app 1604 (e.g., untrusted) and MEC app 1602 (trusted). An ME service provides services for MEC app 1602 at various geographic locations in an edge architecture, data center, or in other computing environments. MEC app 1602 and/or ME service 1606 could be migrated to another resource.

Various embodiments provide for role-based access control (RBAC) applied to tenants. A tenant context can be maintained across edge computing infrastructure. The UE can be one embodiment of a tenant. The UE may be a complex OS having many processes, users and the like, but the UE to multi access edge computing (MEC) App correlation is what defines the Tenant in the context of MEC deployments.

In some examples, tenant-specific keys can be provisioned and made available for use by a different process for the same tenant (or a different tenant). Within the context of an MEC architecture, a peer's MEC can maintain keys and provision keys in a backend architecture that runs workload. An MEC app can RDMA or copy the keys to an execution environment. At a point when a workload scheduled to run, the keys can be used by a requester to ensure data is encrypted while can preserve tenant isolation boundary during execution.

Figure 17:
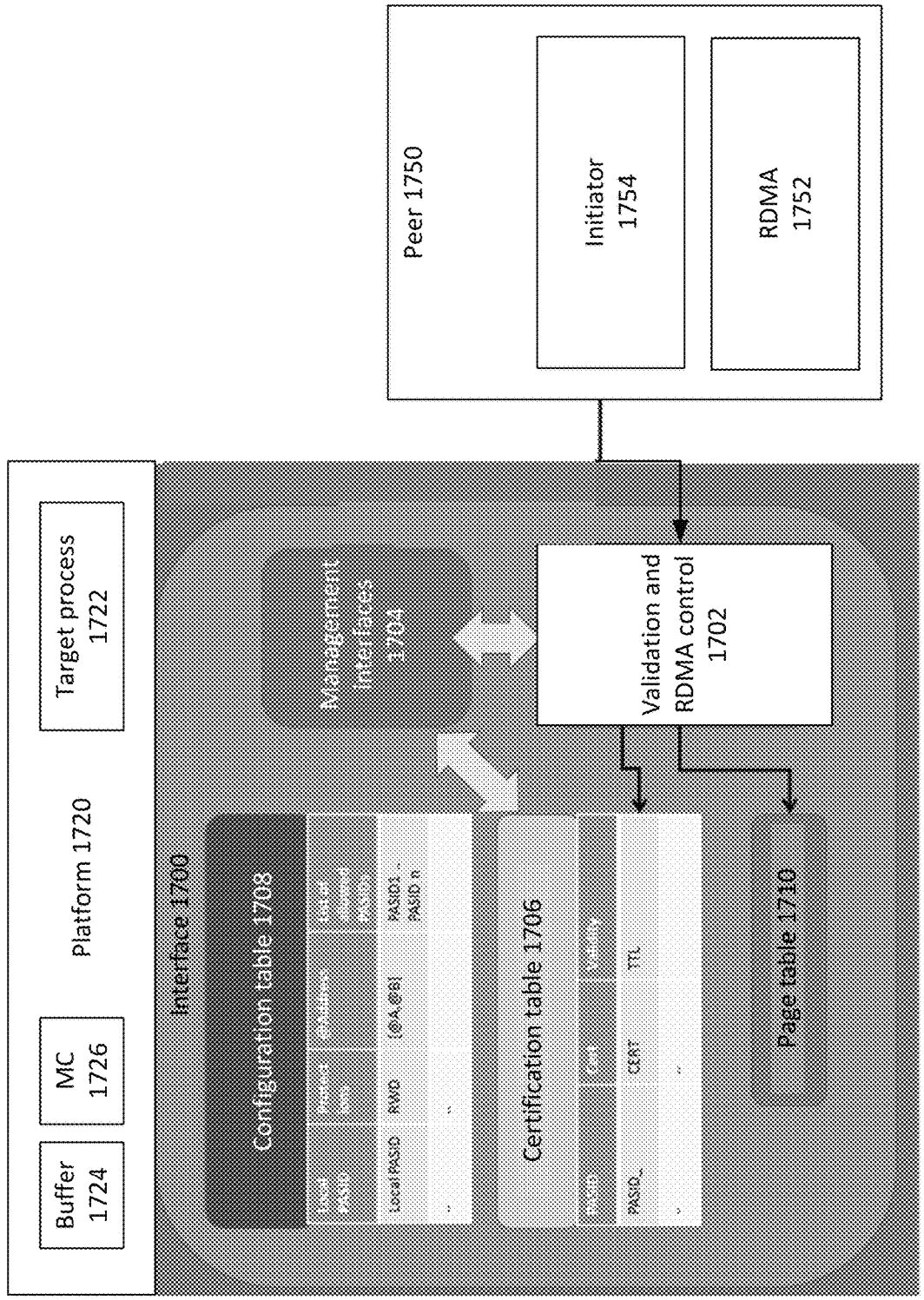
FIG. 17 provides a high level architecture of a system.

FIG. 17 provides a high level architecture of a system. In some examples, a tenant workload can be built into multiple processes, VMs, or containers that interact across platforms or nodes. For example, to continue operation across platforms or nodes, peer 1750 can send a workload to interface 1700. The architecture can be used in an interface 1700 (e.g., Host Fabric Interface or network interface card), for example. Various embodiments of interface 1700 perform or include: (1) certification to store and manage certificates from sources accessing memory ranges within a local node and corresponding permissions based on received certificates; (2) validation of requests as well as memory access checks (e.g., within different ranges of a page of a local node); and (3) interfaces to manage certification and configuration in an out-of-band fashion or in-band fashion.

In some examples, interface 1700 receives a workload request with encrypted cipher text, interface 1700 determines if the workload request is permitted by performing an access check based on a certificate, and memory controller 1726 writes the encrypted cipher text into memory. In some examples, interface 1700 receives cipher text, interface 1700 performs decryption of the cipher text to produce received content, interface 1700 performs an access check, a memory controller 1726 applies encryption to the receive content before writing the content to the memory region. A workload can request a memory region read or write request or other actions (e.g., create, update, delete, or notify).

Management interfaces 1704 can control access to certification table 1706 and configuration table 1708. Management interfaces 1704 can interface with validation and RDMA control 1702. In some examples, management interfaces 1704 can be accessed both in-band (e.g., ring 0 or kernel mode) or out-of-band to configure certificates of peer PASIDs (e.g., tokens) of the systems and a list of peer PASIDS that can access to that memory as well as the type of protection being associated to that range. For example, in-band management can be from a dedicated set of control plane and management plane devices whereas out-of-band can include an orchestrator defining permitted interactions across platforms or nodes by specific processes, VMs or containers. For example, a management console configures table 1708 or the system initializes such that each memory region is assigned an owner (PASID) and that resource authorizes creation/update of protections and allowed PASIDs).

Peer 1750 can present a workload to management interfaces 1704. A received workload can be signed by a tenant key (e.g., encrypted using a tenant key) and arrive with tenant certificate. A certificate can identify a tenant (e.g., peer 1750) in some cases. Management interfaces 1704 can use the received certificate to create an appropriate entry in a certification table 1706 and set an expiration (e.g., time to live (TTL)) for the entry. A TTL can be used to limit a time of validity of a certificate and its corresponding transactions. Management interface 1704 can control the value of TTL for a certificate. The certificate has a validity period that applies to the lifetime of the certificate (and potentially to the lifetime of the associated key). A TTL can correspond to when a particular requester or target are executed and transactions would likely occur. Management interface 1704 can reduce the TTL in some cases. For example, if the requester system is known to be compromised and existing access is to be revoked/rescinded by shortening the TTL. In some cases, the key in use may be approaching end to its useful life due to excessive use before the certificate expiration as key life could be based on usage and the TTL can be adjusted to coincide with the life of the key.

For example, certification table 1706 can track the following information for a work request in an entry.

| Content | Example, non-limiting description |
| --- | --- |
| PASID | PASID identifier of tenant process that requested a workload performance. |
| Certification | Certification included (yes/no). |
| TTL | Time to live of certification. |

In some examples, a tenant can be identified by a node identifier (Node ID) and a local Process Address Space ID (PASID). A local PASID can be used by interface 1700 and platform 1720 to identify the tenant and the local PASID can be assigned irrespective of a PASID of the tenant assigned by a different device.

An entry in certification table 1706 can also include a "Token" that is signed by an attestation provider. An attestation provider could be an issuer of the certificate presented with the workload request. The token could be an indication by interface 1700 to permit access by peer 1750 to a memory region in platform 1720 after performing an attestation protocol with peer 1750. An entry in certification table 1706 can include a key or keys (e.g., MKTME keys) for use to access a memory region using a memory controller (MC) 1726. The key(s) can be used to decrypt or encrypt a memory region for a particular PASID. Entries of certification table 1706 can be stored in encrypted or protected memory (e.g., encrypted using a platform key or using the MKTME key of one of the trust anchor entities).

Access by peer 1750 (e.g., MEC app) to a memory region (e.g., buffer 1724) can be contingent on passing token check in addition to passing certification check and other checks and a PASID of peer 1750 that issued the work request being in the list of allowed PASIDs. Other checks could include the PASID of peer 1750 not being on a blacklist (e.g., list of prohibited accessors). Entries in configuration table 1708 can be accessed to determine an access policy to apply. For a local PASID, an entry in configuration table 1708 can indicate the following information.

| Content | Example, non-limitins description |
| --- | --- |
| Local PASID | PASID identifier of local tenant (on node). Local PASID can represent a memory region (e.g., buffer 1724). |
| Protections | Permission (or not) for workload associated with an allowed PASID to create, read, update, delete, write, or notify. |
| @address | Page-size address range (beginning and end). |
| List of allowed PASIDs | PASIDs of tenants that can interact with a page range, subject to permission. |

In some examples, level of access (protections) at page-level granularity where access can be one or more of: create, read, update, delete, write, or notify. For a page-sized region of memory, protections can indicate access protection for a PASID (e.g., tenant) associated with a work request. A configuration can include a list of allowed PASIDs that specify tenant(s) with associated work requests that can interact with a page region, subject to protections. A tenant could be local or remote tenant from platform 1720. A page can be 4 KB in size but sizes greater than or less than a page can be access controlled such as 2 KB sub-pages or other sizes. In some examples, configurations of memory controller 1726 can define page size, number of pages and page table size.

For a local PASID, finer granularity protections can be applied whereby a particular memory region has certain protections and another region within the memory region has other protections. Page table 1710 can indicate if that particular table contains different sub-pages that may have different protections. For example, a particular sub-page can have particular protections for a tenant PASID, another sub-page can have different protections for the same tenant PASID.

Certification table 1706 and configuration table 1708 can be securely stored using platform private keys to prevent data from being accessible even with physical tampering.

Page table 1710 can store mapping between virtual addresses and physical addresses. A page table entry in page table 1710 can convert a virtual address in configuration table 1708 to a physical addresses in buffer 1724. In some examples, validation and RDMA control 1702 can encrypt page table 1710 using one or more keys.

An example operation of interface 1700 can be as follows. At Action A, initiator 1754 (executing on peer 1750) sends a request to interface 1700 and signs the request with a certificate. At Action B, management interfaces 1704 determines if the certificate provided with the request is valid. Verification of initiator 1754 can include: (1) accessing the certificate for the remote PASID of initiator 1754 and (2) validating the request signature with the given certificate. If the certificate provided with the request is valid, at Action C, by specification of an entry in configuration table 1708, target process 1722 associated with memory region [a,b] in buffer 1724 identifies initiator 1754 is trusted on platform 1720. At Action D, a "load/store" is performed at PASID p, offset o, in buffer 1724. At Action E, a translation of <p,o> to a page table entry (PTE) address (β)+sub-page block (y)+remainder (p) in in buffer 1724 occurs using page table 1710. A PTE can map virtual addresses to physical addresses. At Action F, if sub-page protections in effect at the indicated PTE, then access rights for the address range are applied for initiator 1754. At Action G, encryption or decryption with key that is specific to address and sub-page <(B,y)> is permitted to be performed to access the address and sub-page <(B,y)>. For example, a write operation can include a memory controller 1726 reading content from the memory region, decrypting the read content using the key, overwriting part of the decrypted content with the received data, encrypting the updated content, and writing the encrypted content to the memory region. A read operation can include memory controller 1726 reading content from a memory region, decrypting the read content, and providing the content to interface 1700 for transmission to peer 1750.

In some examples, memory controller 1726 can perform encrypt-in-place to encrypt received content to generate cyphertext blocks and write cyphertext blocks over available memory regions a block at a time. A ciphertext block can have a block size that is defined by the crypto algorithm used and the key size. For example, AES-GCM can be used as a crypto algorithm. A key size can be 128-bits.

In response to interface 1700 permitting a request to access a memory region, interface 1700 allows memory controller 1726 in platform 1720 to use a proper private key to write to or read from the memory region allocated to target process 1722, which can exclusively access the memory range or is an identifier of the memory region. In some examples, interface 1700 sends the permitted request to memory controller 1726 and provides one or more applicable keys or the local PASID for target process 1722 instead of the PASID for initiator 1754 for use by memory controller 1726 to retrieve the applicable one or more keys. The one or more keys can be used by memory controller 1726 to encrypt content to be written to a memory region or decrypt content to be read from a memory region.

In some cases, one or more keys are allocated to a VM and the VM controls access to an address range. The VM can share use of the key with another VM (e.g., remote VM) so that the other VM can decrypt a memory region using the key but not decrypt other memory regions without the proper key. Various embodiments allow definition of explicit regions of VM memory to use a specific key that can used by a transaction from a remote VM and a transaction from the remote VM can only decrypt limited memory regions allocated to the local VM.

Various embodiments make reference to various technologies such as, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions), components that make up TME and MKTME, the manner in which TME and MKTME operate, and so forth. These technologies can be used to provide a readily comprehensible perspective for understanding the various disclosed embodiments and are not intended to limit implementations to employing only TME and MKTME. TME provides a scheme to encrypt data by memory interfaces whereby a memory controller encrypts the data flowing to the memory or decrypts data flowing from memory and provides plain text for internal consumption by the processor.

In some examples, TME is a technology that encrypts a device's entire memory or portion of a memory with a key. When enabled via basic I/O system (BIOS) (or Universal Extensible Firmware Interface (UEFI), or a boot loader) configuration, TME can provide for memory accessed by a processor on an external memory bus to be encrypted, including customer credentials, encryption keys, and other intellectual property (IP) or personal information. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses can be encrypted and is in plain text while inside the processor circuitry. This allows existing software to run unmodified while protecting memory using TME. There may be scenarios where it would be advantageous to not encrypt a portion of memory, so TME allows the BIOS (or UEFI or bootloader) to specify a physical address range of memory to remain unencrypted. The software running on a TME-capable system has full visibility into all portions of memory that are configured to not be encrypted by TME. This can be accomplished by reading a configuration register in the processor.

In some embodiments, TME can support multiple encryption keys (Multi-Key TME (MKTME)) and provides the ability to specify the use of a specific key for a page of memory. This architecture allows either processor-generated keys or tenant-provided keys, giving full flexibility to customers. VMs and containers can be cryptographically isolated from each other in memory with separate encryption keys which can be used in multi-tenant cloud environments. VMs and containers can also be pooled to share an individual key, further extending scale and flexibility.

Note that reference to a VM can refer to any virtualized execution environment. A virtualized execution environment can include at least a virtual machine, process containers, machine containers, or application processes. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

In some cases, initiator 1754 can be a serverless application or function (e.g., FaaS) that calls another function in a chain of functions. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

Various embodiments can leverage a server or computing platform to perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

Figure 18:
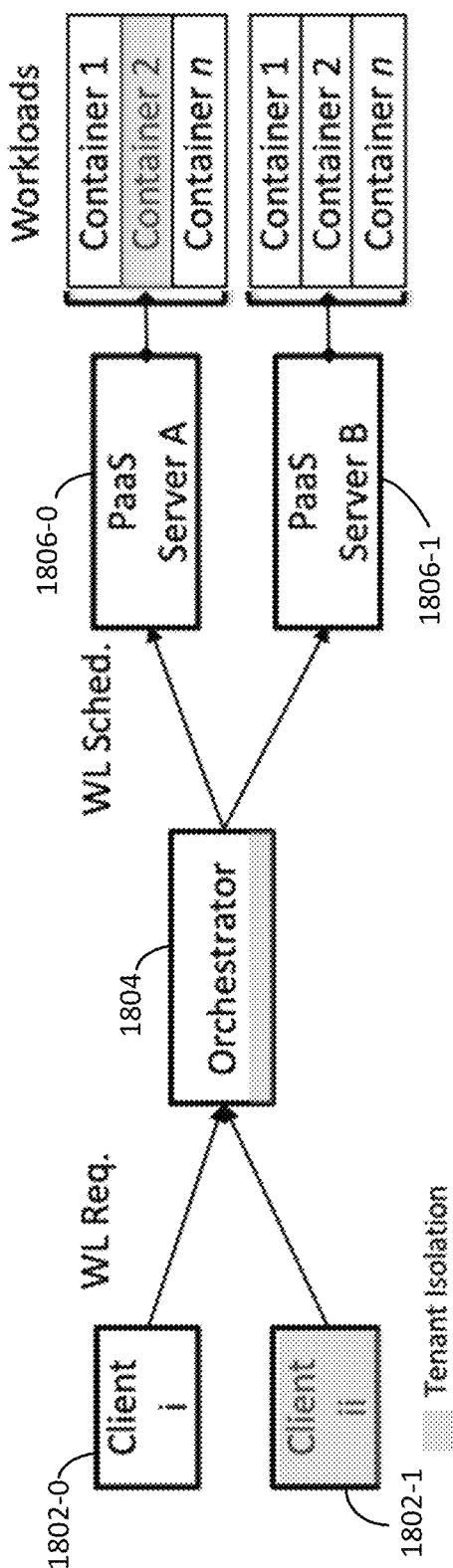
FIG. 18 shows a simplified view of a system.

FIG. 18 shows a simplified view of an architecture that supports multiple tenants with tenant isolation. One or more clients 1802-0 and 1802-1 (e.g., ME app) provides its workload to be performed by one or more computing resources 1806-0 and 1806-1 (e.g., platform as a service (PaaS)). Orchestration service 1804 can manage and issue workload performance to one or more computing resources 1806-0 and 1806-1. In some examples, an ME service is instantiated using a container that runs on a service and the container is isolated. In this example, client 1802-1 is isolated from client 1802-0 such that a container that performs a workload for client 1802-1 is isolated (e.g., does not share memory) with another container.

The architectures ensures that the resources allocated to the tenant are not already in use by a second tenant and that tenant data is protected (e.g., encrypted) from peer tenants (who may be adversarial). Multiple manners of providing protection can be used including virtualization, physical partitioning, secure enclaves, Intel® SGX, AMD Memory Encryption Technology, AMD Secure Memory Encryption (SME) and Secure Encrypted Virtualization (SEV), ARM® TrustZone®, Apple Secure Enclave Processor, or Qualcomm® Trusted Execution Environment. A secure enclave can be a region of memory or a processor or both that are not accessible by processes except for designated and limited processes, virtual machines, or containers.

Figure 19:
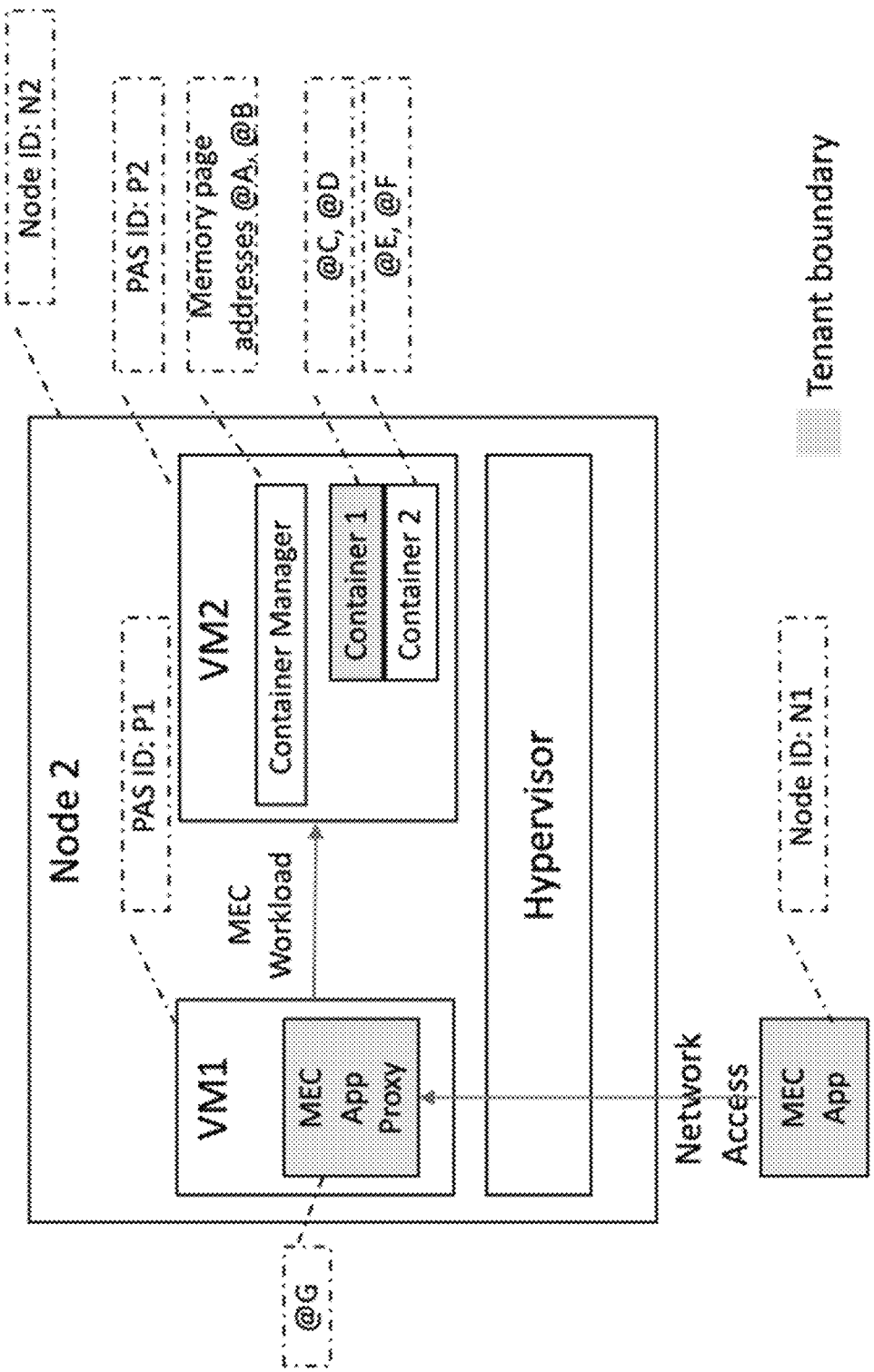
FIG. 19 shows an example use case.

FIG. 19 shows an example use case where a MEC App interacts with a MEC Server Node (Node 2) to perform a workload for the MEC App. However, the architecture can be applied for any applications or uses. A MEC app can execute on node 1. For example, on node 2, a VM1 can run a MEC App Proxy for the MEC app on node 1. An address space of @G can be allocated to MEC App Proxy. A VM2 running on node 2 can run a container manager, and containers 1 and 2. Container 1 can be allocated to access memory regions @C and @D. Container 2 can be allocated to access memory regions @E and @F. Tenant boundaries can be maintained between MEC App and a process executed or memory access on behalf of MEC App by use of container 1 and isolated memory. An example of utilization of this environment is described next.

Figure 20:
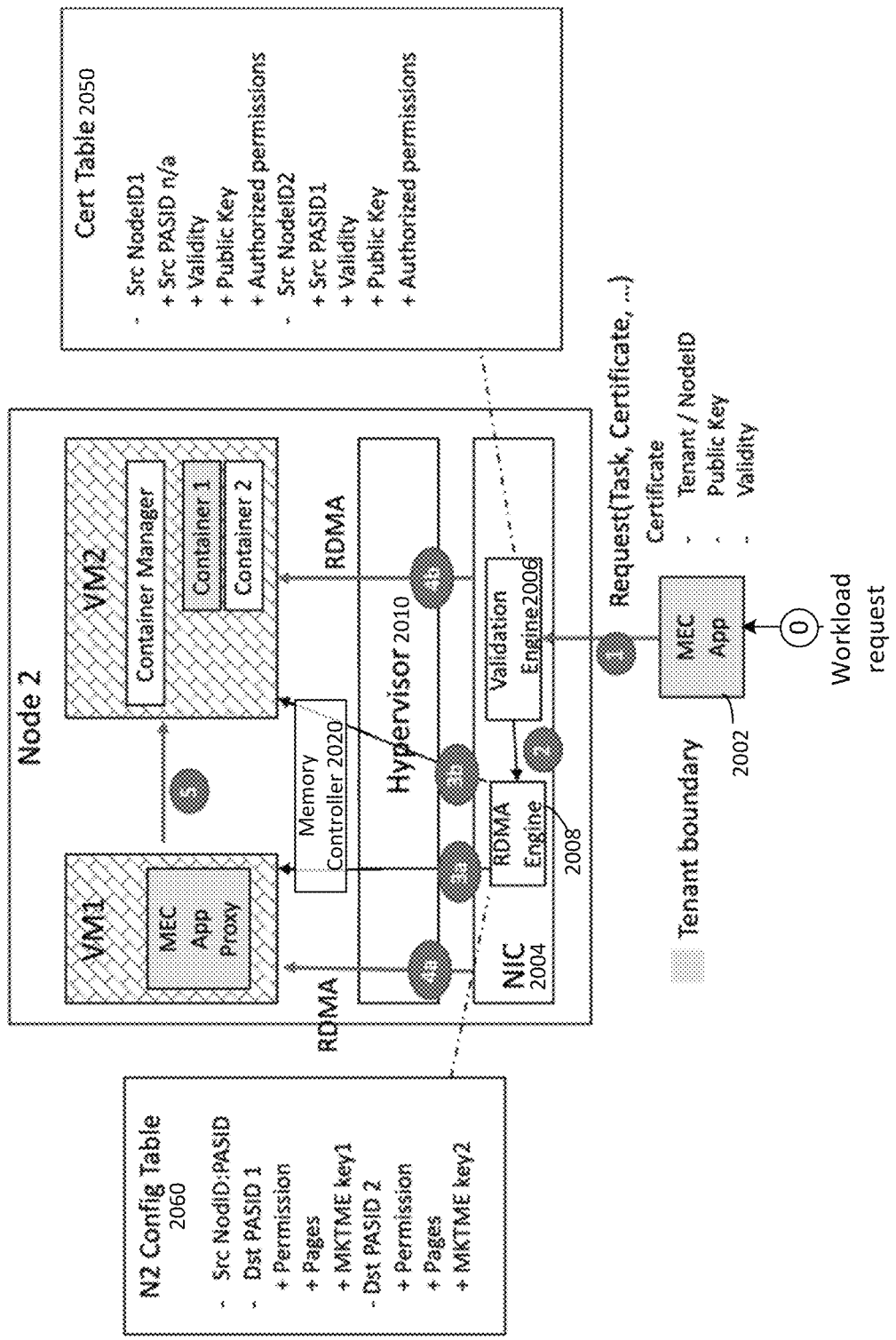
FIG. 20 shows an example of workload verification and performance.

FIG. 20 shows an example where a peer (e.g., MEC app) requests a workload operation or service hosting and an MEC app credential (e.g., certificate) is used to authorize the MEC app to perform the workload task. A UE (not shown) at Node1 can be enabled to securely provide data to a memory accessible to a VM1 or VM2 running on Node 2. Conversely VM1 or VM2 running on Node 2 can be enabled to securely provide data to a memory on Node1. A node can be a core, CPU socket, rack, server, data center, edge network device, or fog network device. Node1 and Node 2 can different nodes. Communication between Node1 and Node 2 can take place using one or more of: a private or public network, fabric, or interconnect. Embodiments of FIG. 20 can apply to any environment beyond MEC and UE where any virtualized execution environment or application, device or process requests access (e.g., create, read, update, delete, write, or notify) on a memory region in another device.

In this example, a workload request includes encrypted data to be written to a memory region of Node 2. Validation engine 2006 of NIC 2004 can determine if a credential or certificate received with a workload request is accepted and what access rights are permitted for the workload request associated with the certificate. In some examples, the certificate can include a tenant identifier or nodeID of the sender, a key (e.g., public key), and a validity token. As is described in more detail herein, based on content in the certificate, a certification (cert) table 2050 can be accessed by validation engine 2006 to determine whether a sender (e.g., UE app) is permitted to access memory in the Node 2 or not permitted (e.g., blacklisted). Where the certificate is valid, RDMA engine 2008 can determine a configuration of available memory regions, memory access rights, and associated cryptography keys. RDMA engine 2008 can provide one or more keys for memory controller 2020 to use to decrypt data to be read from the available memory region or encrypt data to be written to an available memory region. In some cases, if a workload request includes a request to read data from an available memory region and RDMA engine 2008 can provide one or more keys for memory controller 2020 to use to decrypt data that is read from the memory region. For example, memory controller 2020 reads ciphertext from the memory region and if the target consumer is a CPU, then memory controller 2020 decrypts the ciphertext. If a page table points to a data or instruction cache line into the CPU, then memory controller 2020 decrypts ciphertext before being written into the cacheline. However, if the page table points to memory or storage, then memory controller 2020 encrypts data and writes the encrypted data into memory or storage (e.g., encrypt in-place) or, as described earlier, reads data, decrypts data, modifies data with received data, encrypts the modified data, and writes encrypted modified data to memory. In some cases, MKTME keys are used for decryption or encryption of memory regions using application or tenant specific encryption keys. In this example, tenant data can be protected using encryption of memory pages with a key (e.g., MKTME keys).

Reference is next made to a sequence of possible actions. At action (0), MEC app 2002 receives a workload request from a UE app (not shown). MEC app 2002 can be executed on Node 2 or another node and act as a proxy for the UE app. The UE app can be executed on another node than Node 2 such as Node 1. The workload request can be received with a certificate of the issuer (e.g., UE app). In some cases, the workload request is accompanied by data to be written to Node2. The workload request is received at NIC 2004.

At Action (1), validation engine 2006 verifies a certificate for a received workload request by decrypting the certificate using a key for example. If validation engine 2006 verifies a certificate for a received workload request, validation engine 2006 constructs an entry in Certificate Table (Cert Table) 2050 registering MEC app 2002 with its authorized permissions. For a request verified by having a valid certificate, validation engine 2006 forwards the request to RDMA engine 2008.

Note that although not described, RDMA engine 2008 can establish RDMA connectivity with at least one other network interface such as that used by Node 1 using a Verbs API (e.g., RDMA Protocol Verbs Specification (Version 1.0) (2003) and successors and derivatives thereof). Other direct copy protocols can be used such as remote direct memory access (RDMA), InfiniBand, Internet Wide Area RDMA Protocol (iWARP), RDMA over Converged Ethernet (RoCE). For example, for at least RDMA, send queue and receive queue can be used to transfer work requests and are referred to as a Queue Pair (QP). A requester can place a work request instructions on its work queues that informs an interface contents of buffers to send to or receive content from. A work request can include an identifier (e.g., pointer or memory address of a buffer). For example, a work request placed on the send queue can include an identifier of a message or content in a buffer (e.g., app buffer) to be sent. By contrast, an identifier in a work request in the receive queue can include a pointer to a buffer (e.g., app buffer) where content of an incoming message can be stored. A Completion Queue (CQ) can be used to notify when the instructions placed on the work queues have been completed.

At Action (2), RDMA engine 2008 performs key provisioning for a requestor from Node 1 using information in the Certificate Table 2050 to generate (e.g., symmetric) keys. Configuration table 2060 stores keys for the UE app based on the UE apps' particular PASID. RDMA engine 2008 can configure protections using keys from configuration table 2060. In some examples, the request received in Action 0 could include keys in addition or alternative to being provided with a certificate. In some examples, a context can be used by RDMA engine 2008 to generate keys using, for example, a sigma protocol. If supported by the request protocol, RDMA engine 2008 may provision keys from information from MEC App 2002.

In this example, configuration table 2060 specifies that PASID1 for VM1 and PASID2 for container 1 can be accessed based on an identifier of the requester (e.g., Src PASID1 and NodeID1 associated with the UE app). In other words, configuration table 2060 specifies access rights to the workload request for PASID1 and PASID2 for particular address regions for the UE app that sent the workload request.

In some examples, NIC 2004 and its validation engine 2006 are trusted to generate or protect keys for use to decrypt data read from a memory region or encrypt data to be written to a memory region. For example, to perform encryption of memory pages, NIC 2004 can use Intel QAT technology integrated into NIC 2004 or other data encryption or decryption or network security (e.g., IPSec, SSL, or TLS) offload engine.

At Action (3), RDMA engine 2008 provides keys to memory controller 2020. The keys can be stored in a memory accessible to RDMA engine 2008. In some examples, RDMA engine 2008 permits memory controller 2020 to use key(s) to access a particular permitted region or sub-region. For example, a CPU can have a memory controller integrated into the CPU for memory read or writes. At Action (4), RDMA engine 2008 can copy data to memory controller 2020 associated with a destination memory region and memory controller 2020 can decrypt data and write the data to memory. RDMA engine 2008 can provide keys to memory controller 2020 in connection with a write or read. As stated earlier, a destination of the data can influence whether memory controller 2020 decrypts or encrypts data. If a destination is memory or storage, the data can be encrypted. If a destination is a cache line, the data can be decrypted. If a destination is a device connected using a network interface, then data could be decrypted on writing into a communications buffer which may then be encrypted and sent to a networked peer using a different key.

Memory controller 2020 can use keys to decrypt data associated with a workload request prior to writing the data into a permitted memory region. For example, memory controller 2020 can decrypt data to be written to VM1's memory with MKTME Key1 (e.g., memory region @G) or decrypt data to be written to VM2's memory using MKTME key2 (e.g., memory regions @C or @D). In some examples, memory controller 2020 can use the MKTME keys to decrypt data prior to being provided to NIC 2004 for transmission to a Node2 and NIC 2004 can use any key to encrypt the data prior to transmission.

Memory controller 2020 can encrypt data and write encrypted data using the same or using different keys. For example, data received by memory controller 2020 from MEC app 2002 can be decrypted using MKTME key 1 prior to writing into VM1 memory region or can be decrypted using MKTME key2 prior to writing into container 1 memory region.

In some embodiments, an RDMA capability in memory controller 2020 performs both encryption and decryption. In other embodiments, RDMA engine 2008 and a worker process in a VM or container may perform encryption or decryption operations using applicable MKTME keys.

An application may be divided into multiple threads to improve parallelism. The data may be shared across multiple VMs to achieve maximum parallelism. Action (5) can support parallelism by copying content between protocol address space (PAS) resources may occur. A copy engine (e.g., direct memory access (DMA) or memory controller 2020) can encrypt content from memory region @G and decrypt the content before writing to memory region @C or @D using appropriate keys. In some examples, a third MKTME key can be used by the copy engine to write content to pages shared between VM1 and VM2 (but not shared between NIC 2004 and VM1 or NIC 2004 and VM2).

Figure 21:
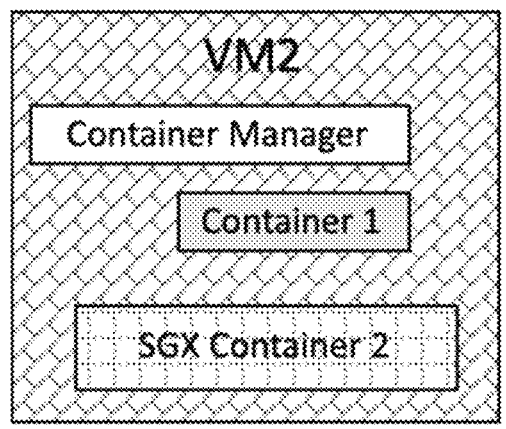
FIG. 21 shows a use case involving data protection schemes.

FIG. 21 shows a use case involving a process address space (PAS) resources such as Intel SGX can be used where an SGX hardened container is identified as one of the PAS targets. In this example, in a memory region used by VM2, SGX can be used to encrypt content for container 2. An MKTME key can be used to encrypt content for container 1. In this scenario, a configuration table identifies use of SGX pages and the MKTME key may be NULL since SGX may supply a system key for encrypting and integrity protecting keys. In other embodiments, the MKTME key may be used to encrypt SGX pages.

An SGX security model may use an architectural enclave such as a Platform Configuration Enclave (PCE) or a Platform Services Enclave (PSE) to allow access to SGX protected PAS pages. A DMA path from network interface to memory can be brokered by a hypervisor using a technique described in "TECHNOLOGIES FOR HYBRID VIRTUALIZATION AND SECURE ENCLAVE POLICY ENFORCEMENT FOR EDGE ORCHESTRATION", filed Dec. 28, 2018, Ser. No. 16/234,731, which is incorporated by reference in its entirety. In another embodiment, a trusted NIC (e.g., one with Intel QAT integration or encryption/decryption offload engine) may be recognized by an SGX capable memory controller and SGX capable CPU to perform RDMA directly into SGX enclave pages.

Figure 22A:
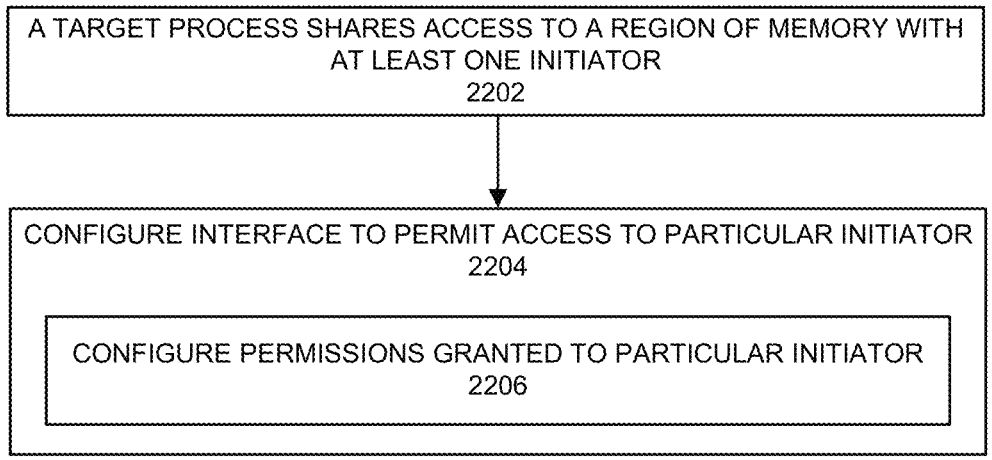
FIGS. 22A and 22B depict processes.

FIG. 22A depicts an example process. The process can be performed by entities to permit access to a memory region by another entity. At 2202, a target process shares access to a region of memory with at least one initiator. For example, a target process can have an allocated region of memory and use the key to access the region of memory. In some example, the target process can share access to a sub-region of the region of memory with at least one initiator. In some examples, a certificate issuer or interface can perform an attestation protocol with the initiator in order to grant permission to an initiator.

At 2204, an interface to a platform used by the target process can be configured to permit access to the region of memory for a particular initiator. For example, at 2206, the interface can be configured with permissions to the region of memory available to an initiator identified in 2202. Permission can include one or more of: create, read, update, delete, write, or notify. In some examples, permissions can be based on a certificate received with a work request and that identifies a particular initiator that is permitted (or not) to access the region of memory. In some examples, a tenant identifier or node identifier can be used to identify a particular initiator that is permitted (or not) to access the region of memory.

Figure 22B:
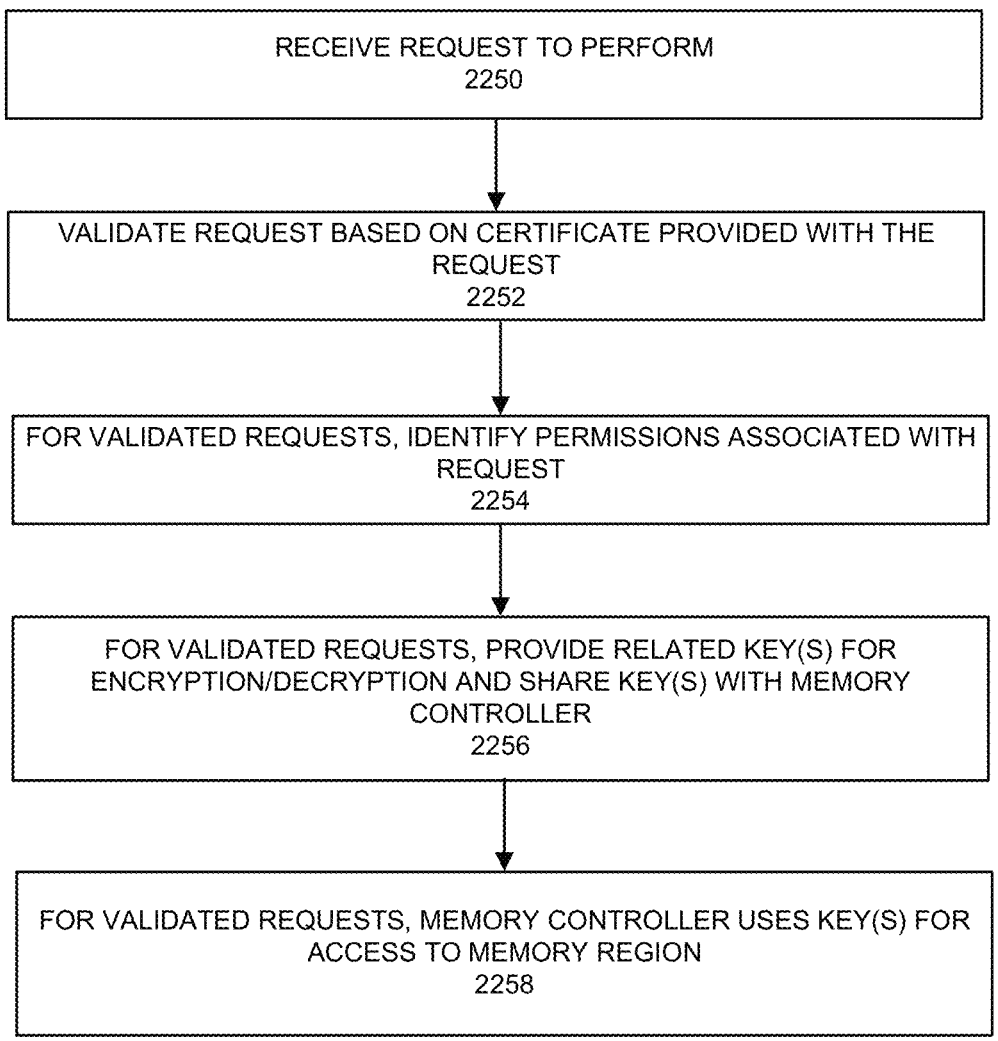

FIG. 22B depicts a process that can be performed to permit execution of a workload. In some examples, the process can be performed by an interface (e.g., network interface or host fabric interface). At 2250, a request to perform workload is received at an interface. The interface can be a network interface or host fabric interface. The request can be received from a proxy that provides an interface to a service back-end to an application. The proxy can be an MEC, for example. The request can be received from a virtualized execution environment. In some examples, the request can be received with a certificate.

At 2252, a determination is made of whether the request is valid based on a certificate provided with the request. The request can be valid if the certificate is registered on the node in a certificate table for example. If the request is valid, the process proceeds to 254. If the request is not valid, an exception can occur or the request is denied (not shown).

At 2254, permissions associated with the request are identified. For example, a configuration table can be used to identify a memory region or sub-region and permissions (e.g., create, read, update, delete, write, or notify) associated with the request.

At 2256, one or more keys used to encrypt or decrypt data associated with the memory region permitted for access by the request can be identified or generated. In some examples, the one or more keys are stored in a look-up table. In some examples, an interface (e.g., NIC or fabric interface) can generate the one or more keys based on content of a received certificate and a sigma protocol. In some examples, the request could include one or more keys. At 2256, the one or more keys can be shared with a memory controller. At 2258, the memory controller can use the key(s) to access data in the memory. For example, the memory controller can decrypt data received from the RDMA engine or the interface prior to storing the data into a cache. In some cases, the memory controller can use the keys to encrypt data to be written to a memory region. In some cases, the memory controller can use the keys to decrypt data read from the memory region prior to providing the encrypted data to the interface for transmission to a requester.

Figure 23:
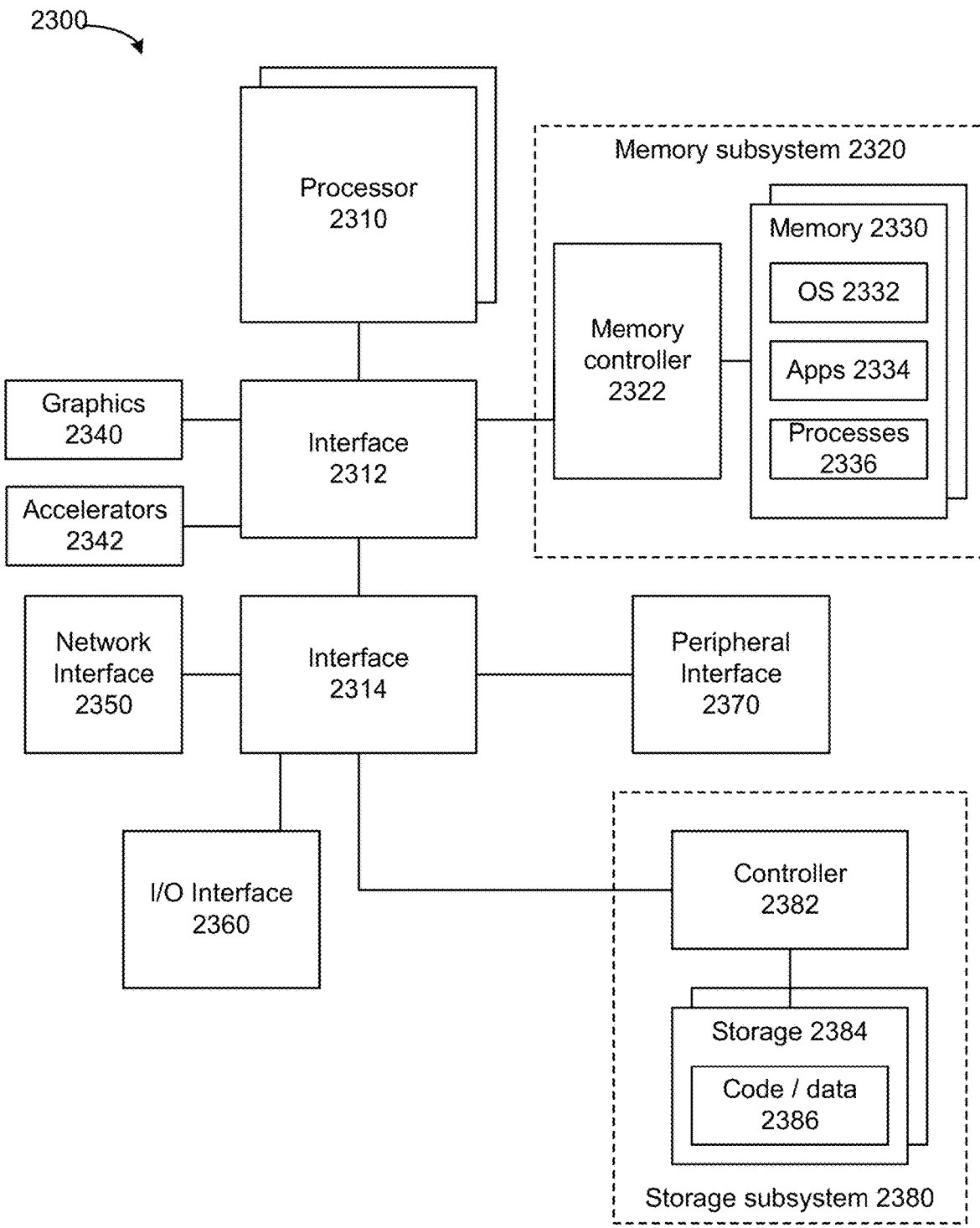
FIG. 23 depicts a system.

FIG. 23 depicts a system. The system can use embodiments described herein to share memory region access and one or more keys with an initiator. System 2300 includes processor 2310, which provides processing, operation management, and execution of instructions for system 2300. Processor 2310 can include any type of microprocessor, central processing unit (CPU), graphics processing unit (GPU), processing core, or other processing hardware to provide processing for system 2300, or a combination of processors. Processor 2310 controls the overall operation of system 2300, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2300 includes interface 2312 coupled to processor 2310, which can represent a higher speed interface or a high throughput interface for system components that needs higher bandwidth connections, such as memory subsystem 2320, graphics interface components 2340, or accelerators 2342. Interface 2312 represents an interface circuit, which can be a standalone component or integrated onto a processor die. Where present, graphics interface 2340 interfaces to graphics components for providing a visual display to a user of system 2300. In one example, graphics interface 2340 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2340 generates a display based on data stored in memory 2330 or based on operations executed by processor 2310 or both. In one example, graphics interface 2340 generates a display based on data stored in memory 2330 or based on operations executed by processor 2310 or both.

Accelerators 2342 can be a programmable or fixed function offload engine that can be accessed or used by a processor 2310. For example, an accelerator among accelerators 2342 can provide compression (DC) capability, cryptography services such as public key encryption (PKE), cipher, hash/authentication capabilities, decryption, or other capabilities or services. In some embodiments, in addition or alternatively, an accelerator among accelerators 2342 provides field select controller capabilities as described herein. In some cases, accelerators 2342 can be integrated into a CPU socket (e.g., a connector to a motherboard or circuit board that includes a CPU and provides an electrical interface with the CPU). For example, accelerators 2342 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2342 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2320 represents the main memory of system 2300 and provides storage for code to be executed by processor 2310, or data values to be used in executing a routine. Memory subsystem 2320 can include one or more memory devices 2330 such as read-only memory (ROM), flash memory, one or more varieties of random access memory (RAM) such as DRAM, or other memory devices, or a combination of such devices. Memory 2330 stores and hosts, among other things, operating system (OS) 2332 to provide a software platform for execution of instructions in system 2300. Additionally, applications 2334 can execute on the software platform of OS 2332 from memory 2330. Applications 2334 represent programs that have their own operational logic to perform execution of one or more functions. Processes 2336 represent agents or routines that provide auxiliary functions to OS 2332 or one or more applications 2334 or a combination. OS 2332, applications 2334, and processes 2336 provide software logic to provide functions for system 2300. In one example, memory subsystem 2320 includes memory controller 2322, which is a memory controller to generate and issue commands to memory 2330. It will be understood that memory controller 2322 could be a physical part of processor 2310 or a physical part of interface 2312. For example, memory controller 2322 can be an integrated memory controller, integrated onto a circuit with processor 2310.

While not specifically illustrated, it will be understood that system 2300 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1384 bus.

In one example, system 2300 includes interface 2314, which can be coupled to interface 2312. In one example, interface 2314 represents an interface circuit, which can include standalone components and integrated circuitry. In one example, multiple user interface components or peripheral components, or both, couple to interface 2314. Network interface 2350 provides system 2300 the ability to communicate with remote devices (e.g., servers or other computing devices) over one or more networks. Network interface 2350 can include an Ethernet adapter, wireless interconnection components, cellular network interconnection components, USB (universal serial bus), or other wired or wireless standards-based or proprietary interfaces. Network interface 2350 can transmit data to a remote device, which can include sending data stored in memory. Network interface 2350 can receive data from a remote device, which can include storing received data into memory. Various embodiments can be used in connection with network interface 2350, processor 2310, and memory subsystem 2320.

In one example, system 2300 includes one or more input/output (I/O) interface(s) 2360. I/O interface 2360 can include one or more interface components through which a user interacts with system 2300 (e.g., audio, alphanumeric, tactile/touch, or other interfacing). Peripheral interface 2370 can include any hardware interface not specifically mentioned above. Peripherals refer generally to devices that connect dependently to system 2300. A dependent connection is one where system 2300 provides the software platform or hardware platform or both on which operation executes, and with which a user interacts.

In one example, system 2300 includes storage subsystem 2380 to store data in a nonvolatile manner. In one example, in certain system implementations, at least certain components of storage 2380 can overlap with components of memory subsystem 2320. Storage subsystem 2380 includes storage device(s) 2384, which can be or include any conventional medium for storing large amounts of data in a nonvolatile manner, such as one or more magnetic, solid state, or optical based disks, or a combination. Storage 2384 holds code or instructions and data 2386 in a persistent state (e.g., the value is retained despite interruption of power to system 2300). Storage 2384 can be generically considered to be a "memory," although memory 2330 is typically the executing or operating memory to provide instructions to processor 2310. Whereas storage 2384 is nonvolatile, memory 2330 can include volatile memory (e.g., the value or state of the data is indeterminate if power is interrupted to system 2300). In one example, storage subsystem 2380 includes controller 2382 to interface with storage 2384. In one example controller 2382 is a physical part of interface 2314 or processor 2310 or can include circuits or logic in both processor 2310 and interface 2314.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2300. More specifically, power source typically interfaces to one or multiple power supplies in system 2300 to provide power to the components of system 2300. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2300 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, and successors or variations thereof.

Figure 24:
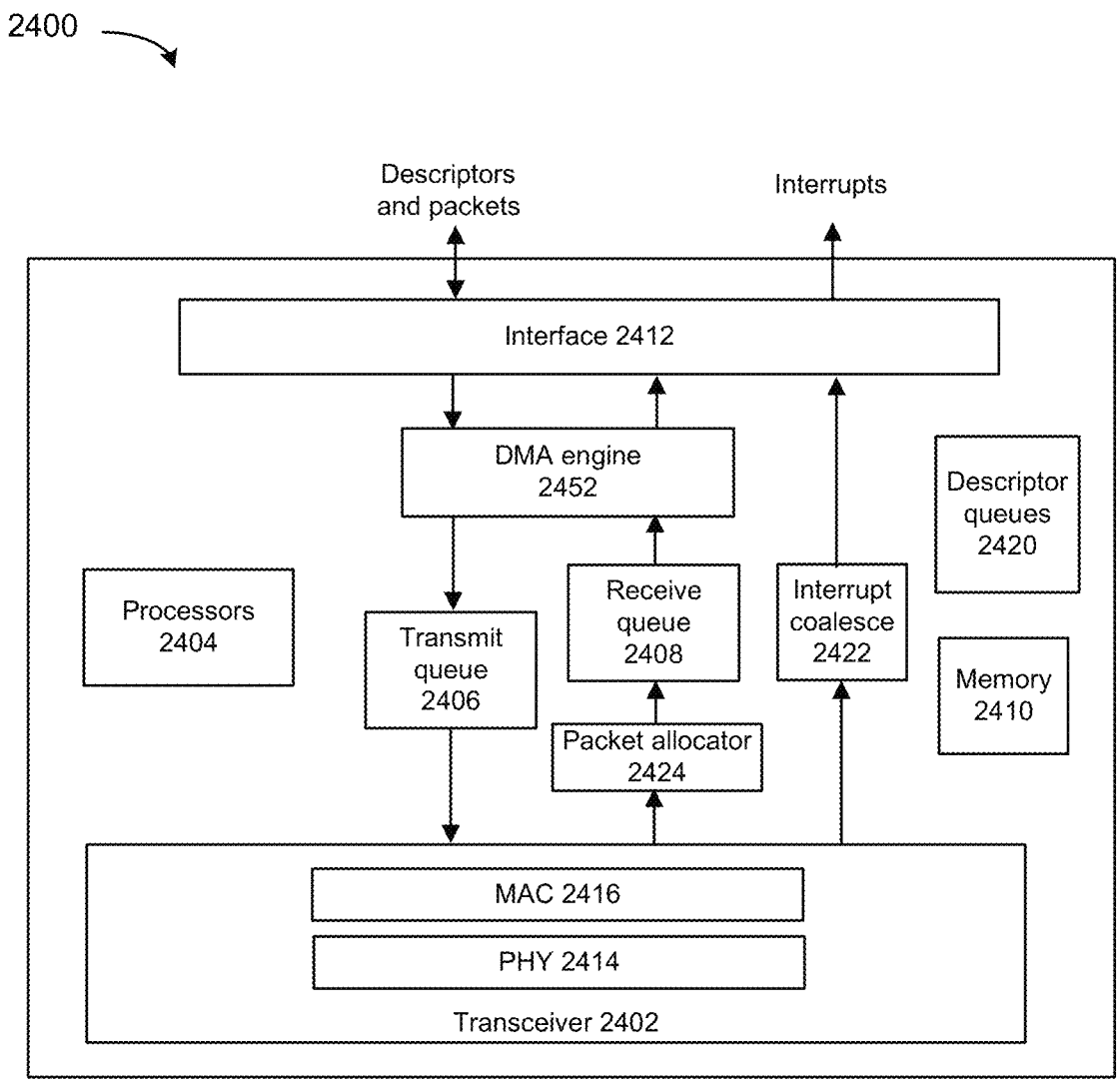
FIG. 24 depicts a network interface.

FIG. 24 depicts a network interface that can use embodiments or be used by embodiments. The network interface can use embodiments described herein in connection with various embodiments for determining available regions of memory to access. Network interface 2400 can include transceiver 2402, processors 2404, transmit queue 2406, receive queue 2408, memory 2410, and bus interface 2412, and DMA engine 2426. Transceiver 2402 can be capable of receiving and transmitting packets in conformance with the applicable protocols such as Ethernet as described in IEEE 802.3, although other protocols may be used. Transceiver 2402 can receive and transmit packets from and to a network via a network medium (not depicted). Transceiver 2402 can include physical layer (PHY) circuitry 2414 and media access control (MAC) circuitry 2416. PHY circuitry 2414 can include encoding and decoding circuitry (not shown) to encode and decode data packets according to applicable physical layer specifications or standards. MAC circuitry 2416 can be configured to assemble data to be transmitted into packets, that include destination and source addresses along with network control information and error detection hash values. MAC circuitry 2416 can be configured to process MAC headers of received packets by verifying data integrity, removing preambles and padding, and providing packet content for processing by higher layers.

A packet may be used herein to refer to various formatted collections of bits that may be sent across a network, using one or more of: Ethernet (IEEE 802.3), remote direct memory access (RDMA), InfiniBand, Internet Wide Area RDMA Protocol (iWARP), User Datagram Protocol (UDP), quick UDP Internet Connections (QUIC), RDMA over Converged Ethernet (RoCE). Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model. A packet header can be an entire header or portion of a header of a packet, e.g., the combination of all the protocol headers. The packet header can be an ordered set. A protocol header can be a collection of header fields. A protocol header can be an ordered set. A header field can include a single header field and a combination of name and a length.

Processors 2404 can be any a combination of a: processor, core, graphics processing unit (GPU), field programmable gate array (FPGA), application specific integrated circuit (ASIC), or other programmable hardware device that allow programming of network interface 2400. For example, processors 2404 can provide for allocation or deallocation of intermediate queues. For example, a "smart network interface" can provide packet processing capabilities in the network interface using processors 2404.

Packet allocator 2424 can provide distribution of received packets for processing by multiple CPUs or cores using timeslot allocation described herein or RSS. When packet allocator 2424 uses RSS, packet allocator 2424 can calculate a hash or make another determination based on contents of a received packet to determine which CPU or core is to process a packet.

Interrupt coalesce 2422 can perform interrupt moderation whereby network interface interrupt coalesce 2422 waits for multiple packets to arrive, or for a time-out to expire, before generating an interrupt to host system to process received packet(s). Receive Segment Coalescing (RSC) can be performed by network interface 2400 whereby portions of incoming packets are combined into segments of a packet. Network interface 2400 provides this coalesced packet to an application.

Direct memory access (DMA) engine 2426 can copy a packet header, packet payload, and/or descriptor directly from host memory to the network interface or vice versa, instead of copying the packet to an intermediate buffer at the host and then using another copy operation from the intermediate buffer to the destination buffer.

Memory 2410 can be any type of volatile or non-volatile memory device and can store any queue or instructions used to program network interface 2400. Transmit queue 2406 can include data or references to data for transmission by network interface. Receive queue 2408 can include data or references to data that was received by network interface from a network. Descriptor queues 2420 can include descriptors that reference data or packets in transmit queue 2406 or receive queue 2408. Bus interface 2412 can provide an interface with host device (not depicted). For example, bus interface 2412 can be compatible with peripheral connect Peripheral Component Interconnect (PCI), PCI Express, PCI-x, Serial ATA (SATA), and/or Universal Serial Bus (USB) compatible interface (although other interconnection standards may be used).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nano station (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

An example includes authentication of a work request received at a network interface with a certificate. Based on a certificate associated with the work request being valid and a process identifier associated with the work request being on a list of entities permitted to access a memory region or sub-region, the network interface permits the work request to be executed and the network interface permits a key or keys to be used by a memory controller to access the memory region or sub-region to perform the work request.

Example 1 includes a computer-implemented method that includes an interface selectively providing access to a memory region for a work request over a network from an entity by providing selective access to a cryptographic key for use by a memory controller to access the memory region.

Example 2 includes any example, wherein the interface selectively providing access to a memory region for a work request from an entity is based on one or more of: validation of a certificate received with the work request and an identifier of the entity being associated with access to the memory region.

Example 3 includes any example, wherein the interface selectively providing access to a memory region for a work request from an entity comprises permitting the entity to perform in the memory region one or more of: create, read, update, delete, write, or notify.

Example 4 includes any example, wherein the memory region is associated with a process and wherein the entity and the process are associated with a same tenant.

Example 5 includes any example, wherein the memory region is associated with a process and wherein the entity and the process comprise virtual execution environments.

Example 6 includes any example, wherein the memory region comprises a page or sub-page sized region.

Example 7 includes any example, wherein the interface selectively provides access to at least one sub-region of the memory region for the work request by providing selective access to at least one cryptographic key for use by the memory controller to access the at least one sub-region.

Example 8 includes any example, different access rights are associated with different sub-regions of the memory region, wherein the access rights comprise one or more of: create, read, update, delete, write, or notify.

Example 9 includes any example, wherein the work request comprises a write request and the work request is associated with received content and the memory controller is to apply the cryptographic key to encrypt content to write in the memory region.

Example 10 includes any example, wherein the work request comprises a read request and the memory controller is to apply the cryptographic key to decrypt content in the memory region and provide the decrypted content for transmission using the interface to a second memory region accessible to the entity.

Example 11 includes any example, and includes comprising providing remote memory access using one or more of: remote direct memory access (RDMA), InfiniBand, Internet Wide Area RDMA Protocol (iWARP), or RDMA over Converged Ethernet (RoCE).

Example 12 includes any example, and includes an apparatus comprising: an interface comprising remote direct copy circuitry configured to: receive a work request associated with a remote direct memory access operation and based on the work request being allowed to access a memory region, provide a key to a memory controller to perform cryptographic operation on content in the memory region to carry out the work request.

Example 13 includes any example, wherein the work request is allowed to access a memory region based on one or more of: validation of a certificate received with the work request and the work request being associated with a process associated with the memory region.

Example 14 includes any example, wherein access the memory region comprises one or more of: create, read, update, delete, write, or notify.

Example 15 includes any example, wherein the memory region comprises at least one sub-region and the interface is to provide a key to the memory controller to perform a cryptographic operation on content in the at least one sub-region to carry out the work request.

Example 16 includes any example, wherein different access rights are associated with different sub-portions of the memory region, wherein the access rights comprise one or more of: create, read, update, delete, write, or notify.

Example 17 includes any example, comprising a computing node, wherein the computing node comprises at least one memory associated with the memory region and comprises the memory controller to perform read or writes to the memory region.

Example 18 includes any example, wherein the work request comprises a write request and the work request is associated with received content and the memory controller is to apply a cryptographic key to encrypt content to write in the memory region.

Example 19 includes any example, wherein the work request comprises a read request and the memory controller is to apply a cryptographic key to decrypt content in the memory region, and provide the decrypted content for transmission using the interface to a second memory region.

Example 20 includes any example, and includes one or more of: a server, data center, rack, computing node, an edge network element, or fog network element.

What is claimed is:

1. A cloud service provider system configurable to be used in association with multiple tenants, the cloud service provider system to be used in providing at least one service associated with at least one of the multiple tenants, the cloud service provider being configurable for use in association with at least one public cloud and/or at least one private cloud, the cloud service provider system comprising:

server hardware for use in executing at least one workload associated with the providing of the at least one service; and multiple memory regions configurable to be associated with the multiple tenants, at least one of the multiple memory regions also to be associated with the at least one workload, the multiple tenants to be assigned access privileges with respect to the multiple memory regions;

wherein:
the server hardware is configurable for use in association with circuitry for use in processing at least one remote direct memory access (RDMA) request associated with the at least one of the multiple memory regions;
the at least one RDMA request is configurable to request at least one RDMA write access to and/or at least one RDMA read access from the at least one of the multiple memory regions;
the at least one RDMA write access is configurable to comprise data encryption for use in subsequent RDMA transmission to the at least one of the multiple memory regions;
the at least one RDMA read access is configurable to comprise RDMA reception of encrypted data from the at least one of the multiple memory regions for subsequent decryption;
the access privileges that are to be assigned to the multiple tenants with respect to the multiple memory regions are to be mutually different from each other, at least in part;
the at least one RDMA request is associated with at least one requesting tenant of the multiple tenants;
the processing comprises determining, based upon which of the access privileges is to be assigned to the at least one requesting tenant, whether to permit the at least one RDMA request;
the cloud service provider system comprises physical server resources;
the physical server resources:
 comprise the server hardware; and
 are configurable to comprise accelerator circuits that comprise graphics processing units (GPUs);
the cloud service provider system is configurable to dynamically allocate, based upon resource utilization trend data, resource utilization performance modeling data, and future resource utilization prediction data associated with the at least one workload, one or more portions of the physical server resources for use in association with the executing of the at least one workload;
the GPUs are configurable to implement one or more artificial intelligence models associated with machine learning and/or neural networks; and
the cloud service provider system is to execute virtual machines and/or containers that are configurable to be associated with the multiple tenants, multiple memory regions, and the at least one workload.

2. The cloud service provider system of claim 1, wherein:
the at least one requesting tenant comprises the at least one of the multiple tenants; and
the at least one of the multiple tenants is to be assigned at least one of the access privileges that is to result in the circuitry permitting the at least one RDMA request.

3. The cloud service provider system of claim 1, wherein:
the at least one requesting tenant comprises at least one other of the multiple tenants; and the at least one other of the multiple tenants is to be assigned at least one of the access privileges that is to result in the circuitry denying the at least one RDMA request.

4. The cloud service provider system of claim 1, wherein:
the server hardware and/or the physical server resources are configurable to be comprised in the at least one public cloud and the at least one private cloud.

5. The cloud service provider system of claim 4, wherein:
the server hardware and/or the physical server resources are configurable to be comprised in both at least one on-premises data center and at least one off-premises data center.

6. The cloud service provider system of claim 5, wherein:
the at least one public cloud, the at least one private cloud, the at least one on-premises data center, and/or the at least one off-premises data center are configured for use in association with mobile edge compute; and
the access privileges are to be determined based upon one or more certificate-associated credentials.

7. At least one non-transitory machine-readable storage medium storing instructions for being executed by at least one machine that is to be associated with a cloud service provider system, the cloud service provider system being configurable to be used in association with multiple tenants, the cloud service provider system to be used in providing at least one service associated with at least one of the multiple tenants, the cloud service provider being configurable for use in association with at least one public cloud and/or at least one private cloud, the cloud service provider system comprising server hardware and multiple memory regions, the instructions, when executed by the at least one machine, resulting in the cloud service provider system being configured to enable performance of operations comprising:
executing, by the server hardware, at least one workload associated with the providing of the at least one service; and
configuring multiple memory regions to be associated with the multiple tenants, at least one of the multiple memory regions also to be associated with the at least one workload, the multiple tenants to be assigned access privileges with respect to the multiple memory regions;

wherein:
the server hardware is configurable for use in association with circuitry for use in processing at least one remote direct memory access (RDMA) request associated with the at least one of the multiple memory regions;
the at least one RDMA request is configurable to request at least one RDMA write access to and/or at least one RDMA read access from the at least one of the multiple memory regions;
the at least one RDMA write access is configurable to comprise data encryption for use in subsequent RDMA transmission to the at least one of the multiple memory regions;
the at least one RDMA read access is configurable to comprise RDMA reception of encrypted data from the at least one of the multiple memory regions for subsequent decryption;
the access privileges that are to be assigned to the multiple tenants with respect to the multiple memory regions are to be mutually different from each other, at least in part;
the at least one RDMA request is associated with at least one requesting tenant of the multiple tenants;

the processing comprises determining, based upon which of the access privileges is to be assigned to the at least one requesting tenant, whether to permit the at least one RDMA request;
the cloud service provider system comprises physical server resources;
the physical server resources:
comprise the server hardware; and
are configurable to comprise accelerator circuits that comprise graphics processing units (GPUs);
the cloud service provider system is configurable to dynamically allocate, based upon resource utilization trend data, resource utilization performance modeling data, and future resource utilization prediction data associated with the at least one workload, one or more portions of the physical server resources for use in association with the executing of the at least one workload;
the GPUs are configurable to implement one or more artificial intelligence models associated with machine learning and/or neural networks; and
the cloud service provider system is to execute virtual machines and/or containers that are configurable to be associated with the multiple tenants, multiple memory regions, and the at least one workload.

8. The at least one non-transitory machine-readable storage medium of claim 7, wherein:
the at least one requesting tenant comprises the at least one of the multiple tenants; and
the at least one of the multiple tenants is to be assigned at least one of the access privileges that is to result in the circuitry permitting the at least one RDMA request.

9. The at least one non-transitory machine-readable storage medium of claim 7, wherein:
the at least one requesting tenant comprises at least one other of the multiple tenants; and
the at least one other of the multiple tenants is to be assigned at least one of the access privileges that is to result in the circuitry denying the at least one RDMA request.

10. The at least one non-transitory machine-readable storage medium of claim 7, wherein:
the server hardware and/or the physical server resources are configurable to be comprised in the at least one public cloud and the at least one private cloud.

11. The at least one non-transitory machine-readable storage medium of claim 10, wherein:
the server hardware and/or the physical server resources are configurable to be comprised in both at least one on-premises data center and at least one off-premises data center.

12. The at least one non-transitory machine-readable storage medium of claim 11, wherein:
the at least one public cloud, the at least one private cloud, the at least one on-premises data center, and/or the at least one off-premises data center are configured for use in association with mobile edge compute; and
the access privileges are to be determined based upon one or more certificate-associated credentials.

13. A method implemented using a cloud service provider system, the cloud service provider system being configurable to be used in association with multiple tenants, the cloud service provider system to be used in providing at least one service associated with at least one of the multiple tenants, the cloud service provider being configurable for use in association with at least one public cloud and/or at least one private cloud, the cloud service provider system comprising server hardware and multiple memory regions, the method comprising:
executing, by the server hardware, at least one workload associated with the providing of the at least one service; and
configuring multiple memory regions to be associated with the multiple tenants, at least one of the multiple memory regions also to be associated with the at least one workload, the multiple tenants to be assigned access privileges with respect to the multiple memory regions;
wherein:
the server hardware is configurable for use in association with circuitry for use in processing at least one remote direct memory access (RDMA) request associated with the at least one of the multiple memory regions;
the at least one RDMA request is configurable to request at least one RDMA write access to and/or at least one RDMA read access from the at least one of the multiple memory regions;
the at least one RDMA write access is configurable to comprise data encryption for use in subsequent RDMA transmission to the at least one of the multiple memory regions;
the at least one RDMA read access is configurable to comprise RDMA reception of encrypted data from the at least one of the multiple memory regions for subsequent decryption;
the access privileges that are to be assigned to the multiple tenants with respect to the multiple memory regions are to be mutually different from each other, at least in part;
the at least one RDMA request is associated with at least one requesting tenant of the multiple tenants;
the processing comprises determining, based upon which of the access privileges is to be assigned to the at least one requesting tenant, whether to permit the at least one RDMA request;
the cloud service provider system comprises physical server resources;
the physical server resources:
comprise the server hardware; and
are configurable to comprise accelerator circuits that comprise graphics processing units (GPUs);
the cloud service provider system is configurable to dynamically allocate, based upon resource utilization trend data, resource utilization performance modeling data, and future resource utilization prediction data associated with the at least one workload, one or more portions of the physical server resources for use in association with the executing of the at least one workload;
the GPUs are configurable to implement one or more artificial intelligence models associated with machine learning and/or neural networks; and
the cloud service provider system is to execute virtual machines and/or containers that are configurable to be associated with the multiple tenants, multiple memory regions, and the at least one workload.

14. The method of claim 13, wherein:
the at least one requesting tenant comprises the at least one of the multiple tenants; and
the at least one of the multiple tenants is to be assigned at least one of the access privileges that is to result in the circuitry permitting the at least one RDMA request.

15. The method of claim 13, wherein:
the at least one requesting tenant comprises at least one other of the multiple tenants; and
the at least one other of the multiple tenants is to be assigned at least one of the access privileges that is to result in the circuitry denying the at least one RDMA request.

16. The method of claim 13, wherein:
the server hardware and/or the physical server resources are configurable to be comprised in the at least one public cloud and the at least one private cloud.

17. The method of claim 16, wherein:
the server hardware and/or the physical server resources are configurable to be comprised in both at least one on-premises data center and at least one off-premises data center.

18. The method of claim 17, wherein:
the at least one public cloud, the at least one private cloud, the at least one on-premises data center, and/or the at least one off-premises data center are configured for use in association with mobile edge compute; and
the access privileges are to be determined based upon one or more certificate-associated credentials.

19. A cloud service provider system configurable to be used in association with multiple tenants, the cloud service provider system to be used in providing at least one service associated with at least one of the multiple tenants, the cloud service provider being configurable for use in association with at least one public cloud and/or at least one private cloud, the cloud service provider system comprising:
server device resources for executing at least one workload associated with the providing of the at least one service; and
multiple memory regions for association with the multiple tenants, at least one of the multiple memory regions also to be associated with the at least one workload, the multiple tenants to be assigned access privileges with respect to the multiple memory regions;
wherein:
the server device resources are configurable for use in association with remote direct memory access (RDMA) device resources for processing at least one RDMA request associated with the at least one of the multiple memory regions;
the at least one RDMA request is configurable to request at least one RDMA write access to and/or at least one RDMA read access from the at least one of the multiple memory regions;
the at least one RDMA write access is configurable to comprise data encryption for use in subsequent RDMA transmission to the at least one of the multiple memory regions;
the at least one RDMA read access is configurable to comprise RDMA reception of encrypted data from the at least one of the multiple memory regions for subsequent decryption;
the access privileges that are to be assigned to the multiple tenants with respect to the multiple memory regions are to be mutually different from each other, at least in part;
the at least one RDMA request is associated with at least one requesting tenant of the multiple tenants;
the processing comprises determining, based upon which of the access privileges is to be assigned to the at least one requesting tenant, whether to permit the at least one RDMA request;
the cloud service provider system comprises physical server resources;
the physical server resources:
comprise the server device resources; and
are configurable to comprise accelerator device resources that comprise graphics processing unit (GPU) devices;
the cloud service provider system is configurable to dynamically allocate, based upon resource utilization trend data, resource utilization performance modeling data, and future resource utilization prediction data associated with the at least one workload, one or more portions of the physical server resources for use in association with the executing of the at least one workload;
the GPU devices are configurable to implement one or more artificial intelligence models associated with machine learning and/or neural networks; and
the cloud service provider system is to execute virtual machines and/or containers that are configurable to be associated with the multiple tenants, multiple memory regions, and the at least one workload.

20. The cloud service provider system of claim 19, wherein:
the at least one requesting tenant comprises the at least one of the multiple tenants; and
the at least one of the multiple tenants is to be assigned at least one of the access privileges that is to result in the RDMA device resources permitting the at least one RDMA request.

21. The cloud service provider system of claim 19, wherein:
the at least one requesting tenant comprises at least one other of the multiple tenants; and
the at least one other of the multiple tenants is to be assigned at least one of the access privileges that is to result in the circuitry denying the at least one RDMA request.

22. The cloud service provider system of claim 19, wherein:
the server device resources and/or the physical server resources are configurable to be comprised in the at least one public cloud and the at least one private cloud.

23. The cloud service provider system of claim 22, wherein:
the server device resources and/or the physical server resources are configurable to be comprised in both at least one on-premises data center and at least one off-premises data center.

24. The cloud service provider system of claim 23, wherein:
the at least one public cloud, the at least one private cloud, the at least one on-premises data center, and/or the at least one off-premises data center are configured for use in association with mobile edge compute; and
the access privileges are to be determined based upon one or more certificate-associated credentials.

25. A cloud service provider system configurable to be used in association with multiple tenants, the cloud service provider system to be used in providing at least one service associated with at least one of the multiple tenants, the cloud service provider being configurable for use in association with at least one public cloud and/or at least one private cloud, the cloud service provider system comprising:
at least one data center, the at least one data center comprising multiple servers for use in association with the multiple tenants, the multiple servers comprising:

server hardware for use in executing at least one workload associated with the providing of the at least one service; and multiple memory regions configurable to be associated with the multiple tenants, at least one of the multiple memory regions also to be associated with the at least one workload, the multiple tenants to be assigned access privileges with respect to the multiple memory regions;

wherein:

the server hardware is configurable for use in association with circuitry for use in processing at least one remote direct memory access (RDMA) request associated with the at least one of the multiple memory regions;

the at least one RDMA request is configurable to request at least one RDMA write access to and/or at least one RDMA read access from the at least one of the multiple memory regions;

the at least one RDMA write access is configurable to comprise data encryption for use in subsequent RDMA transmission to the at least one of the multiple memory regions;

the at least one RDMA read access is configurable to comprise RDMA reception of encrypted data from the at least one of the multiple memory regions for subsequent decryption;

the access privileges that are to be assigned to the multiple tenants with respect to the multiple memory regions are to be mutually different from each other, at least in part;

the at least one RDMA request is associated with at least one requesting tenant of the multiple tenants;

the processing comprises determining, based upon which of the access privileges is to be assigned to the at least one requesting tenant, whether to permit the at least one RDMA request;

the cloud service provider system comprises physical server resources;

the physical server resources:
  comprise the server hardware; and
  are configurable to comprise accelerator circuits that comprise graphics processing units (GPUs);

the cloud service provider system is configurable to dynamically allocate, based upon resource utilization trend data, resource utilization performance modeling data, and future resource utilization prediction data associated with the at least one workload, one or more portions of the physical server resources for use in association with the executing of the at least one workload;

the GPUs are configurable to implement one or more artificial intelligence models associated with machine learning and/or neural networks; and the cloud service provider system is to execute virtual machines and/or containers that are configurable to be associated with the multiple tenants, multiple memory regions, and the at least one workload.

26. The cloud service provider system of claim 25, wherein:

the at least one requesting tenant comprises the at least one of the multiple tenants; and the at least one of the multiple tenants is to be assigned at least one of the access privileges that is to result in the Circuitry permitting the at least one RDMA request.

27. The cloud service provider system of claim 25, wherein:

the at least one requesting tenant comprises at least one other of the multiple tenants; and the at least one other of the multiple tenants is to be assigned at least one of the access privileges that is to result in the circuitry denying the at least one RDMA request.

28. The cloud service provider system of claim 25, wherein:

the server hardware and/or the physical server resources are configurable to be comprised in the at least one public cloud and the at least one private cloud.

29. The cloud service provider system of claim 28, wherein:

the at least one data center comprises at least one on-premises data center and at least one off-premises data center.

30. The cloud service provider system of claim 29, wherein:

the at least one public cloud, the at least one private cloud, the at least one on-premises data center, and/or the at least one off-premises data center are configured for use in association with mobile edge compute; and the access privileges are to be determined based upon one or more certificate-associated credentials.

* * * * *